(12) United States Patent
Kondo et al.

(10) Patent No.: US 8,248,512 B2
(45) Date of Patent: Aug. 21, 2012

(54) IMAGE-CAPTURING APPARATUS, IMAGE-CAPTURING METHOD, DISPLAY APPARATUS, AND DISPLAY METHOD

(75) Inventors: Tetsujiro Kondo, Tokyo (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/483,371

(22) Filed: Jun. 12, 2009

(65) Prior Publication Data

US 2010/0053309 A1    Mar. 4, 2010

Related U.S. Application Data

(63) Continuation of application No. 10/517,500, filed as application No. PCT/JP03/07454 on Jun. 12, 2003, now Pat. No. 7,688,376.

(30) Foreign Application Priority Data

Jun. 13, 2002  (JP) ................ P2002-172211

(51) Int. Cl.
  *H04N 5/225*   (2006.01)
  *H04N 13/04*   (2006.01)
  *G02B 27/22*   (2006.01)
(52) U.S. Cl. ............. 348/340; 348/51; 348/54; 359/463
(58) Field of Classification Search ............. 348/49, 348/54, 37
See application file for complete search history.

(56) References Cited

U.S. PATENT DOCUMENTS

| | | | |
|---|---|---|---|
| 4,993,790 A | 2/1991 | Vick | |
| 5,694,235 A | 12/1997 | Kajiki | |
| 5,855,425 A | 1/1999 | Hamagishi | |
| 5,896,171 A * | 4/1999 | Suzuki | 348/211.14 |
| 6,034,716 A * | 3/2000 | Whiting et al. | 348/36 |
| 6,115,059 A | 9/2000 | Son et al. | |
| 6,304,286 B1 | 10/2001 | Shirai et al. | |
| 6,573,931 B1 * | 6/2003 | Horii et al. | 348/211.14 |
| 6,714,249 B2 * | 3/2004 | May et al. | 348/373 |
| 6,755,534 B2 | 6/2004 | Veligdan et al. | |
| 6,762,794 B1 | 7/2004 | Ogino | |
| 6,827,442 B2 | 12/2004 | Ross et al. | |
| 6,940,646 B2 * | 9/2005 | Taniguchi et al. | 359/463 |
| 6,982,749 B2 * | 1/2006 | Matsui | 348/218.1 |
| 7,061,532 B2 | 6/2006 | Silverstein | |

\* cited by examiner

FOREIGN PATENT DOCUMENTS

| | | |
|---|---|---|
| JP | 8-256359 | 10/1996 |
| JP | 9-54376 | 2/1997 |

*Primary Examiner* — Luong T Nguyen
(74) *Attorney, Agent, or Firm* — Frommer Lawrence & Haug LLP; William S. Frommer; Thomas F. Presson

(57) ABSTRACT

The present invention provides full-parallax images having high spatial resolution in real time. An image-capturing optical unit (21) includes a plurality of prismatic mirrors (41) which rotate at a predetermined period. The side surface of each of the prismatic mirrors (41) reflects a light beam from an object. A camera receives the light beam from the object reflected by the prismatic mirrors (41) in order to capture an image of the object. On the other hand, a display optical unit (32) includes a plurality of prismatic mirrors (51) which rotate in phase with the prismatic mirrors (41) at the same period. A projector emits a light beam corresponding to the image of the object captured by the camera, and such a light beam is reflected by the prismatic mirrors (51). A user may view an image corresponding to the light beam reflected by the prismatic mirrors (51). The present invention, for example, can be applied to an image-capturing apparatus for capturing an image, and a display apparatus for displaying the image captured by the image-capturing apparatus.

21 Claims, 25 Drawing Sheets

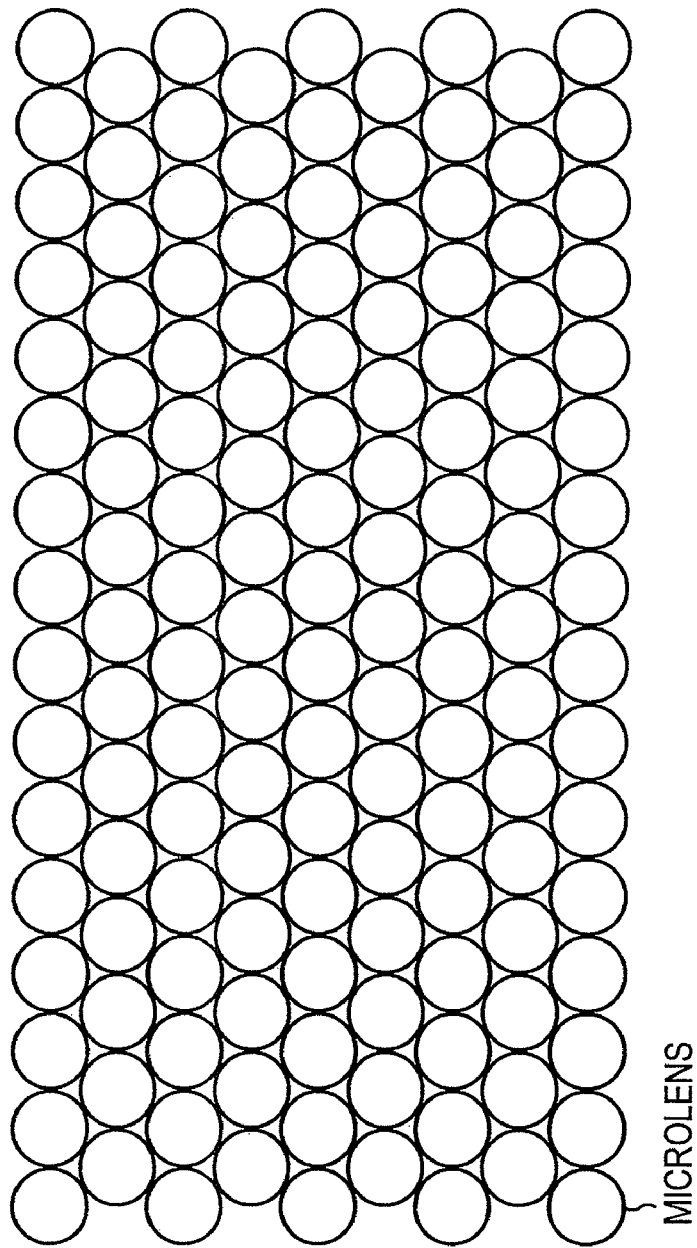

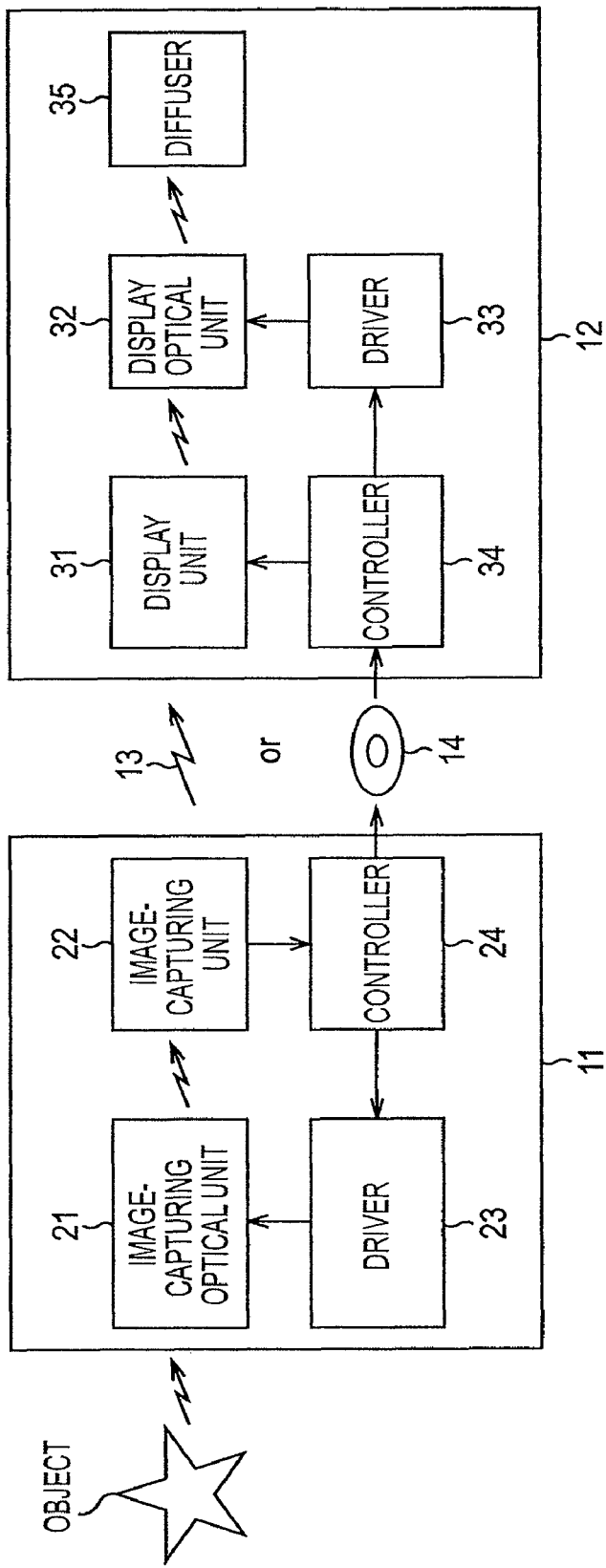

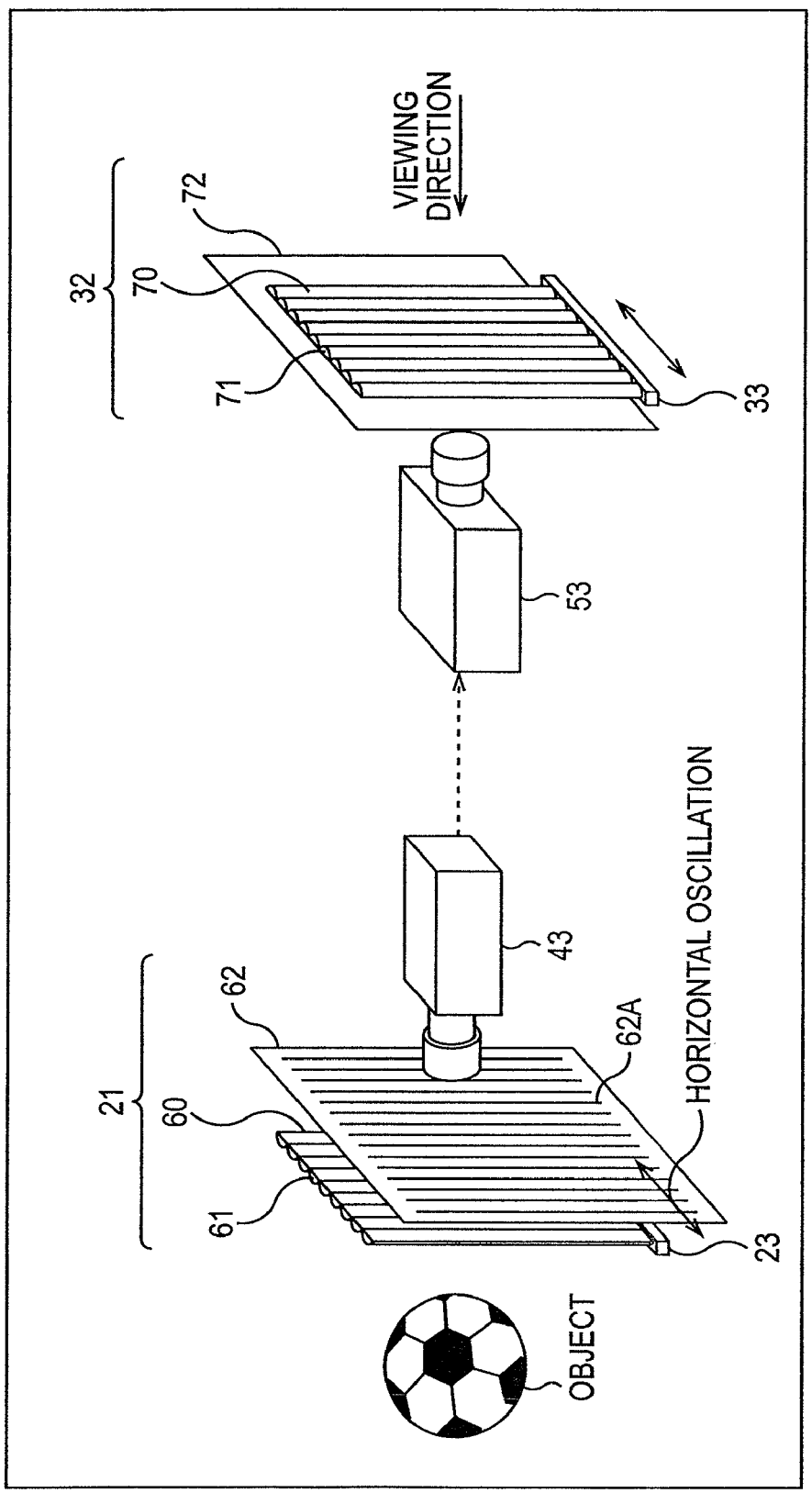

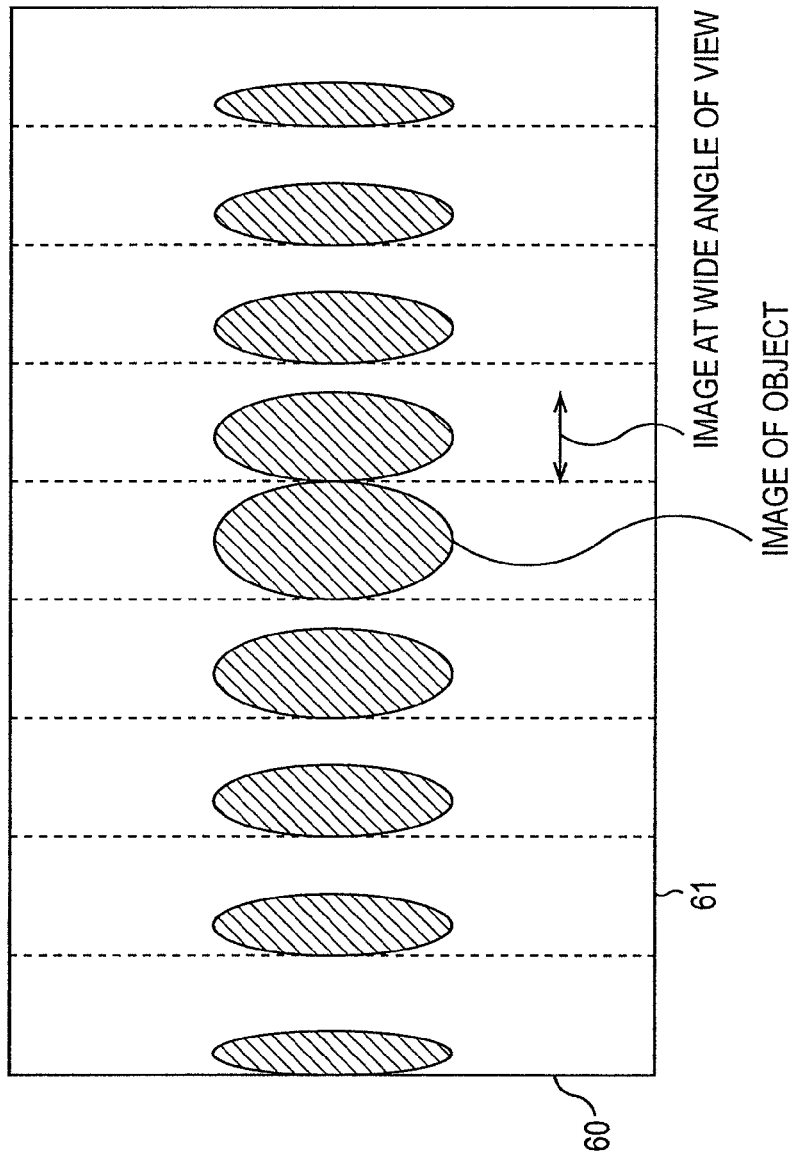

IMAGE-CAPTURING APPARATUS, IMAGE-CAPTURING METHOD, DISPLAY APPARATUS, AND DISPLAY METHOD

This is a continuation of U.S. application Ser. No. 10/517,500, filed on Dec. 10, 2004 now U.S. Pat. No. 7,688,376, which is a 371 of PCT/JP03/07454 filed on Jun. 12, 2003 that claims a priority benefit to Japanese Patent No. 2002-17221 filed in Japan on Jun. 13, 2002, the entirety all of which being hereby incorporated herein by reference.

TECHNICAL FIELD

The present invention relates to image-capturing apparatuses and image-capturing methods, and to display apparatuses and display methods. In particular, the present invention relates to an image-capturing apparatus, an image-capturing method, a display apparatus, and a display method which provide images of an object having high spatial resolution in real time while allowing various viewpoints of the images.

BACKGROUND ART

One known full-parallax image display system that provides selectable viewpoints and presents an image of an object as seen from a viewpoint of a user is, for example, the IP (Integral Photography) 3D-image system developed by NHK (Japan Broadcasting Corporation).

FIG. 1 illustrates an example of the IP 3D-image system.

In the IP 3D-image system, a camera (video camera) 2 captures an image of an object through a lens array 1.

As shown in FIG. 2A in plan view and FIG. 2B in cross-sectional view, the lens array 1 has multiple microlenses disposed in a plane. The camera 2 captures the image of the object through each of the lenses.

In the IP 3D-image system, the image captured by the camera 2 is displayed on a display apparatus 3, such as a liquid crystal display. A lens array 4 having the same structure as the lens array 1 is disposed over the front face of a display screen of the display apparatus 3. A user may see the image displayed on the display apparatus 3 through the lens array 4. Thus, the user is able to view the image of the object from a certain viewpoint.

This means that the image captured by the camera 2 is a combination of image elements (referred to as microlens image-elements hereinafter) of the object seen through the microlenses of the lens array 1. Thus, the image displayed on the display apparatus 3 is a combination of the microlens image-elements. The combination of the microlens image-elements viewed from a certain viewpoint through the lens array 4 having the same structure as the lens array 1 forms an image of the object seen from that particular viewpoint. Such an image is formed of the microlens image-elements seen through the microlenses of the lens array 4, and each of the microlens image-elements includes pixels.

Accordingly, the IP 3D-image system presents an image that can be viewed from the actual viewpoint of the user.

To briefly (or theoretically) describe the IP 3D-image system, an image of an object as seen from a certain viewpoint is a combination of microlens image-elements. The microlens image-elements are gathered by the microlenses of the lens array 4, and include pixels that form the overall image of the object.

This means that the image resolution presented to a user depends on the microlenses of the lens arrays 1 and 4. However, there are limits to reducing the size of the microlenses and also to the number of the microlenses included in each of the lens arrays 1 and 4. This leads to difficulties in providing users with images having high spatial resolution.

Specifically, in the IP 3D-image system, the product of the number of the selectable viewpoints multiplied by the spatial resolution value of an image of one screen (one frame or one field) cannot exceed the spatial resolution value in the display apparatus 3. For this reason, increasing the viewpoints may lead to deterioration of the spatial resolution of an image.

DISCLOSURE OF INVENTION

In view of these circumstances, it is an object of the present invention to provide full-parallax images having high spatial resolution in real time.

An image-capturing apparatus according to the present invention includes an image-capturing optical unit which reflects or transmits a light beam from an object; an image-capturing controller for controlling the image-capturing optical unit to allow the image-capturing optical unit to operate in a periodical manner; an image-capturing driver for driving the image-capturing optical unit based on the control operation by the image-capturing controller; and at least one image-capturing unit which receives the light beam from the object entering via the image-capturing optical unit operating periodically so as to capture an image of the object.

A method for capturing an image of an object according to the present invention includes the steps of controlling an image-capturing optical unit, which reflects or transmits a light beam from the object, so as to allow the image-capturing optical unit to operate in a periodical manner; driving the image-capturing optical unit based on the controlling step; and receiving the light beam from the object via the image-capturing optical unit operating periodically so as to capture the image of the object.

A display apparatus according to the present invention includes at least one light-emitting unit for emitting a light beam corresponding to the image of the object; a display optical unit for reflecting or transmitting the light beam emitted from at least one light-emitting unit; a display controller for controlling the display optical unit to allow the display optical unit to operate in a periodical manner; and a display driver for driving the display optical unit based on the control operation by the display controller.

A method for displaying an image of an object according to the present invention includes the steps of controlling a display optical unit, which reflects or transmits a light beam corresponding to the image of the object, so as to allow the display optical unit to operate in a periodical manner; and driving the display optical unit based on the controlling step.

According to the image-capturing apparatus and the image-capturing method of the present invention, the image-capturing optical unit, which reflects or transmits a light beam from an object, is controlled such that the image-capturing optical unit operates in a periodical manner. Based on the control operation, the image-capturing optical unit is driven. Furthermore, by receiving the light beam from the object via the image-capturing optical unit operating periodically, the image of the object is captured.

According to the display apparatus and the display method of the present invention, a display optical unit, which reflects or transmits a light beam corresponding to the image of the object, is controlled such that the display optical unit operates in a periodical manner. Based on the control operation, the display optical unit is driven.

BRIEF DESCRIPTION OF THE DRAWINGS

FIG. 2A includes a plan view and a cross-sectional view of lens arrays 1 and 4.

FIG. 2B includes a plan view and a cross-sectional view of the lens arrays 1 and 4.

FIG. 3 is a block diagram illustrating an embodiment of an image-capturing/display system employing the present invention.

FIG. 14 is a perspective view of the image-capturing optical unit 21 and the display optical unit 32 according to a second embodiment.

FIG. 15A includes a plan view and a cross-sectional view of a lens plate 60.

FIG. 15B includes a plan view and a cross-sectional view of the lens plate 60.

BEST MODE FOR CARRYING OUT THE INVENTION

Figure 1:
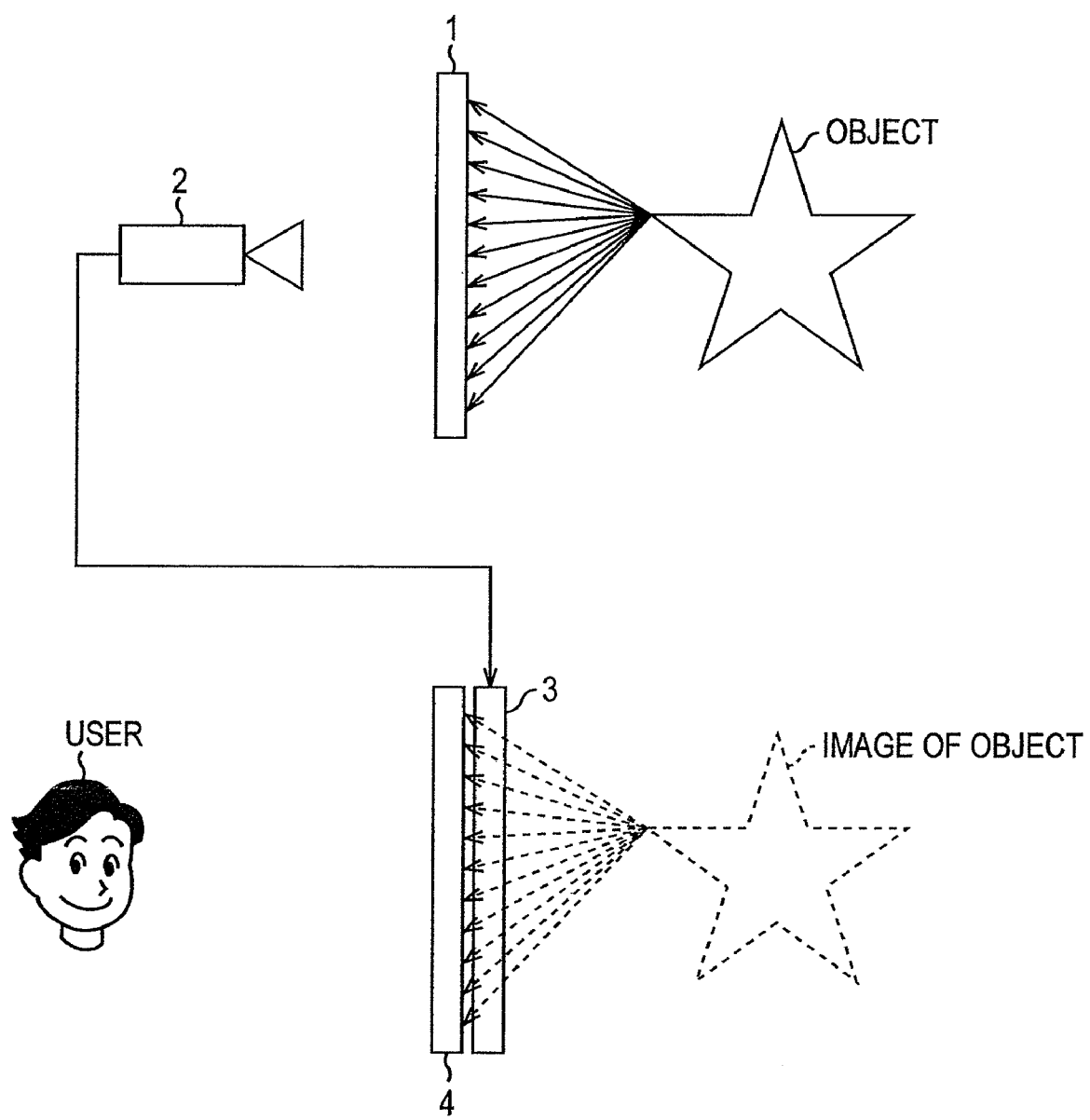
FIG. 1 illustrates an example of an IP 3D-image system.

FIG. 3 illustrates an embodiment of an image-capturing/display system employing the present invention. (The term "system" refers to a product having multiple apparatuses orderly assembled together, meaning that the apparatuses do not necessarily need to be disposed within the same housing).

According to the embodiment shown in FIG. 3, the image-capturing/display system includes an image-capturing apparatus 11 and a display apparatus 12.

The image-capturing apparatus 11 includes an image-capturing optical unit 21, an image-capturing unit 22, a driver 23, and a controller 24. The image-capturing apparatus 11 captures an image of an object and outputs the corresponding image data.

In detail, the image-capturing optical unit 21 reflects or transmits a light beam from the object towards the image-capturing unit 22. The image-capturing unit 22 receives the light beam from the object via the image-capturing optical unit 21 so as to capture the image of the object. Thus, the obtained image data of the object is sent to the controller 24. Based on the control operation by the controller 24, the driver 23 drives the image-capturing optical unit 21. The controller 24 controls the driver 23 in a manner such that the image-capturing optical unit 21 operates in a periodical manner. Moreover, the controller 24 generates drive data for the driver 23 so that the image-capturing optical unit 21 can be driven at a predetermined timing. The controller 24 then multiplexes the drive data and the image data of the object sent from the image-capturing unit 22, and outputs the multiplexed data.

The multiplexed data output from the controller 24 is transmitted through a wireless or closed-circuit transmission medium 13, such as a satellite connection, terrestrial broadcast waves, a telephone line, the Internet, or a cable television (CATV) network. Alternatively, the multiplexed data may be recorded onto a recording medium 14, such as a semiconductor memory, a magnetic disc, or a magneto-optical disc.

The display apparatus 12 includes a display unit 31, a display optical unit 32, a driver 33, a controller 34, and a diffuser 35. The display apparatus 12 displays the image data corresponding to the multiplexed data transmitted through the transmission medium 13, or the image data corresponding to the multiplexed data played back via the recording medium 14.

In other words, the display unit 31 receives the image data from the controller 34, and emits a light beam corresponding to the image data towards the display optical unit 32. The display optical unit 32 has a similar structure to the image-capturing optical unit 21 such that the display optical unit 32 reflects or transmits the light beam emitted from the display unit 31 towards the diffuser 35. Based on the control operation by the controller 34, the driver 33 drives the display optical unit 32. The controller 34 demultiplexes the multiplexed data sent from the transmission medium 13 or the recording medium 14 into the image data of the object and the drive data, and sends the image data to the display unit 31. Moreover, the controller 34 controls the driver 33 such that the display optical unit 32 operates in the same periodical manner as the image-capturing optical unit 21.

In this case, the controller 34 controls the driver 33 based on the drive data separated from the multiplexed data so as to allow the display optical unit 32 to operate in the same periodical manner as the image-capturing optical unit 21.

The diffuser 35 is formed of a diffusive material, such as ground glass, which can diffuse received light beams. The diffuser 35 diffuses the light beam reflected or transmitted by the display optical unit 32 so as to display the corresponding image of the light beam.

The optical positional relationship between the image-capturing unit 22 and the image-capturing optical unit 21 is basically equivalent to the optical positional relationship between the display unit 31 and the display optical unit 32.

Figure 4:
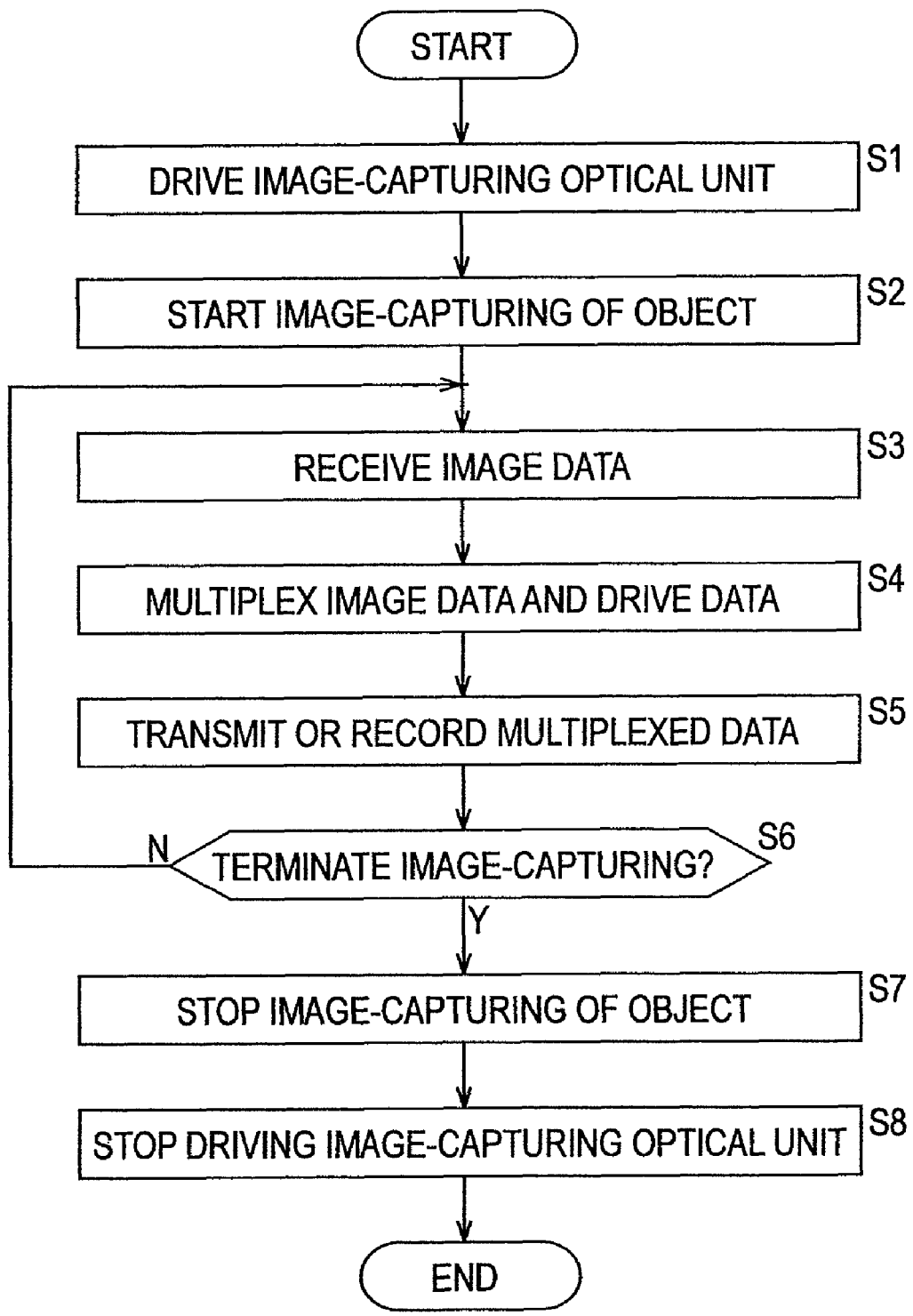
FIG. 4 is a flow chart illustrating the operation of an image-capturing apparatus 11.

Referring to a flow chart shown in FIG. 4, the image-capturing operation for capturing an image of an object performed by the image-capturing apparatus 11 in FIG. 3 will now be described.

In step S1, the controller 24 controls the driver 23 in order to start driving the image-capturing optical unit 21. Thus, the image-capturing optical unit 21 starts to operate in a periodical manner at a predetermined period.

In step S2, the image-capturing unit 22 starts capturing an image of an object. In detail, the image-capturing optical unit 21 that previously started operating in a periodical manner in step S1 reflects or transmits a light beam from the object towards the image-capturing unit 22. The image-capturing unit 22 receives the light beam from the object via the image-capturing optical unit 21, and performs a photo-electric conversion on the light beam so as to obtain image data of the object. The obtained image data is sent to the controller 24 in, for example, a frame-by-frame manner.

In step S3, the controller 24 receives one frame of image data from the image-capturing unit 22, and the operation proceeds onto step S4. In step S4, the controller 24 generates drive data for the driver 23 so as to allow the image-capturing optical unit 21 to be driven at a predetermined timing. Moreover, in step S4, the controller 24 multiplexes the drive data and the image data received in step S3 so as to form multiplexed data. The operation then proceeds onto step S5. In step S5, the controller 24 transmits the multiplexed data via the transmission medium 13, or records the multiplexed data onto the recording medium 14. The operation then proceeds onto step S6.

In step S6, the controller 24 determines whether or not an operating unit, which is not shown in the drawings, is operated by a user in order to terminate the image-capturing of the image data (referred to as image-capture termination hereinafter).

In step S6, if it is determined that the image-capture termination is not performed by the user, the operation returns to step S3 where the controller 24 waits for the image data of the subsequent frame unit from the image-capturing unit 22. Then, the same process is repeated again.

On the other hand, if it is determined that the image-capture termination is performed by the user in step S6, the operation proceeds to step S7 where the image-capturing unit 22 stops the image-capturing of the object. The operation then proceeds to step S8. In step S8, the controller 24 controls the driver 23 so as to stop driving the image-capturing optical unit 21. Thus, the image-capturing optical unit 21 stops its periodical operation, whereby the image-capturing operation is terminated.

Figure 5:
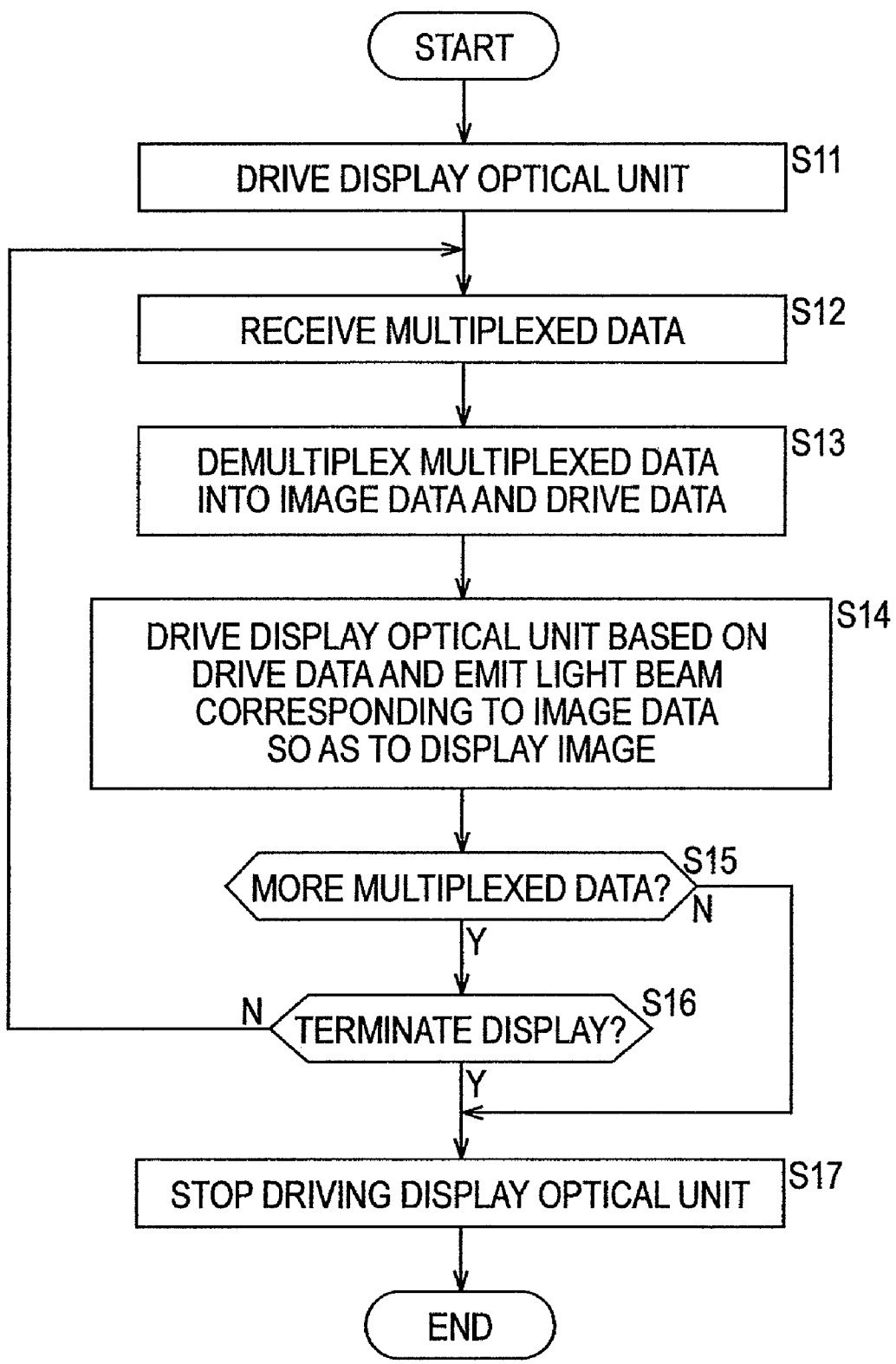
FIG. 5 is a flow chart illustrating the operation of a display apparatus 12.

Referring to a flow chart shown in FIG. 5, the display operation for displaying an image of an object performed by the display apparatus 12 in FIG. 3 will now be described.

In step S1, the controller 34 controls the driver 33 in order to start driving the display optical unit 32. Thus, the display optical unit 32 starts to operate in a periodical manner at a predetermined period.

Here, the controller 34 controls the driver 33 such that the display optical unit 32 operates in the same periodical manner as the image-capturing optical unit 21. The periods of the operation of the image-capturing optical unit 21 and the display optical unit 32 are, for example, preliminarily set in the respective controllers 24 and 34. Alternatively, in this embodiment, since the drive data included in the multiplexed data sent to the display apparatus 12 originally indicates the timing for driving the image-capturing optical unit 21, the controller 34 may perform its control operation based on the same drive data corresponding to the period of the operation of the image-capturing optical unit 21.

In step S12, the controller 34 receives the multiplexed data corresponding to one frame unit via the transmission medium 13 or the recording medium 14. The operation then proceeds onto step S13. In step S13, the controller 34 demultiplexes the multiplexed data received in step S12 into the image data of one frame unit and the drive data, and sends the image data to the display unit 31. The operation then proceeds to step S14.

In step S14, the controller 34 controls the driver 33 so as to allow the display optical unit 32 to be driven based on the drive data separated from the multiplexed data in step S13. In other words, the controller 34 controls the driving operation of the display optical unit 32 via the driver 33 based on the drive data such that the (positional) phase of the display optical unit 32 is equivalent to the phase of the image-capturing optical unit 21 when the image-capturing of the image data, which was previously multiplexed with the drive data, was performed. Consequently, the phase of the display optical unit 32 becomes equivalent to the phase of the image-capturing optical unit 21 as when the image of the object was captured by the image-capturing apparatus 11.

Furthermore, in step S14, the display unit 31 emits a light beam corresponding to the image data sent from the controller 34. The light beam is reflected or transmitted by the display optical unit 32 and enters the diffuser 35. The diffuser 35 diffuses the light beam from the display optical unit 32, whereby the image corresponding to the light beam is displayed.

In step S15, the controller 34 determines whether subsequent multiplexed data is to be sent via the transmission medium 13 or the recording medium 14. If it is determined that the subsequent multiplexed data is to be sent, the operation proceeds to step S16. In step S16, the controller 34 determines whether an operating unit, which is not shown in the drawings, is operated by a user in order to terminate the display of the image data (referred to as display termination hereinafter).

In step S16, if it is determined that the display termination is not performed by the user, the operation returns to step S12 where the controller 34 receives the subsequent multiplexed data sent from the transmission medium 13 or the recording medium 14. Then, the same process is repeated again.

On the other hand, if it is determined that subsequent multiplexed data is not to be sent via the transmission medium 13 or the recording medium 14 in step S15, or that the display termination is performed by the user in step S16, the operation proceeds to step S17 where the controller 34 controls the driver 33 so as to stop driving the display optical unit 32. Thus, the display optical unit 32 stops its periodical operation, whereby the display operation is terminated.

Figure 6:
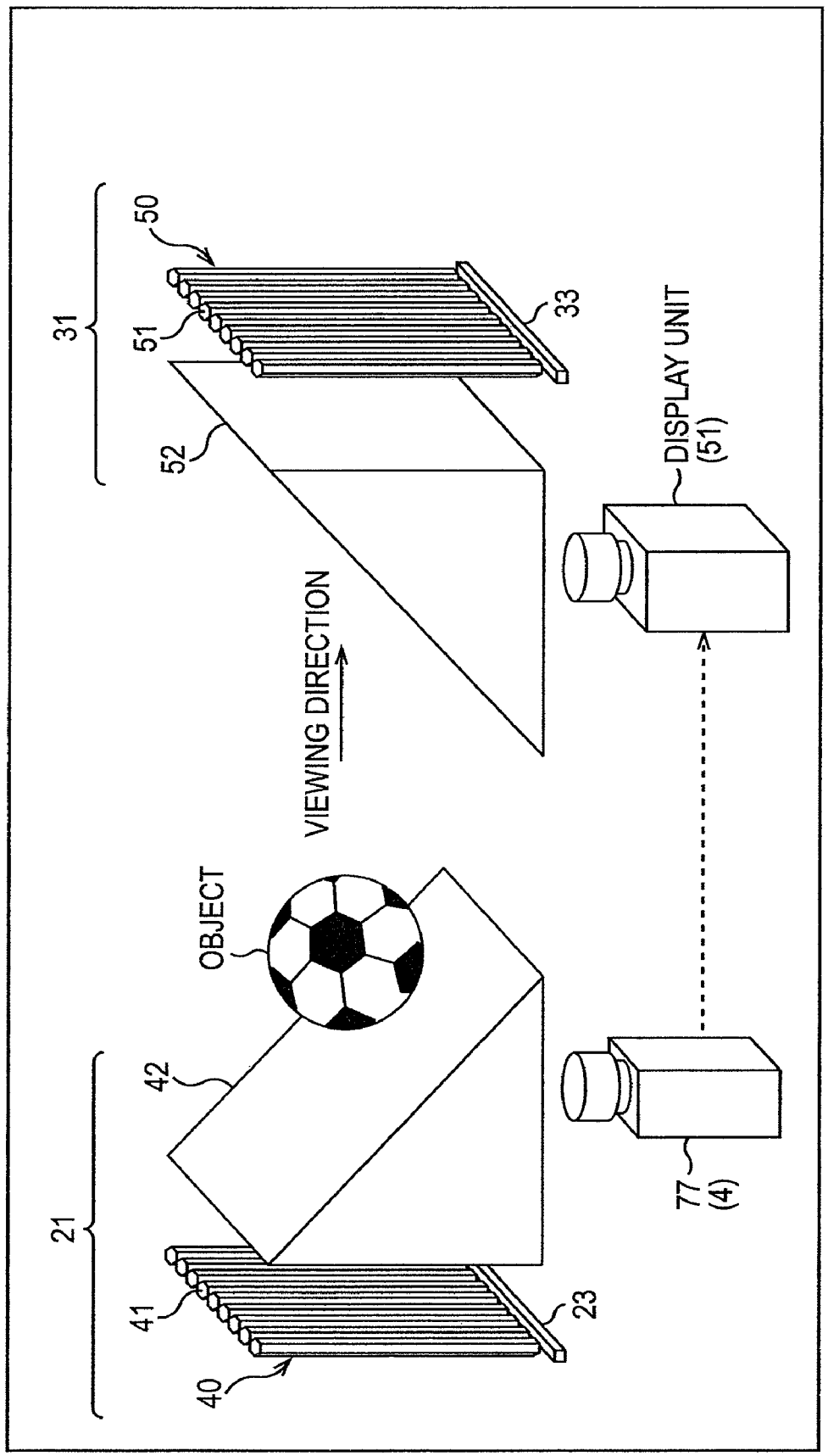
FIG. 6 is a perspective view of an image-capturing optical unit 21 and a display optical unit 32 according to a first embodiment.
Figure 7:
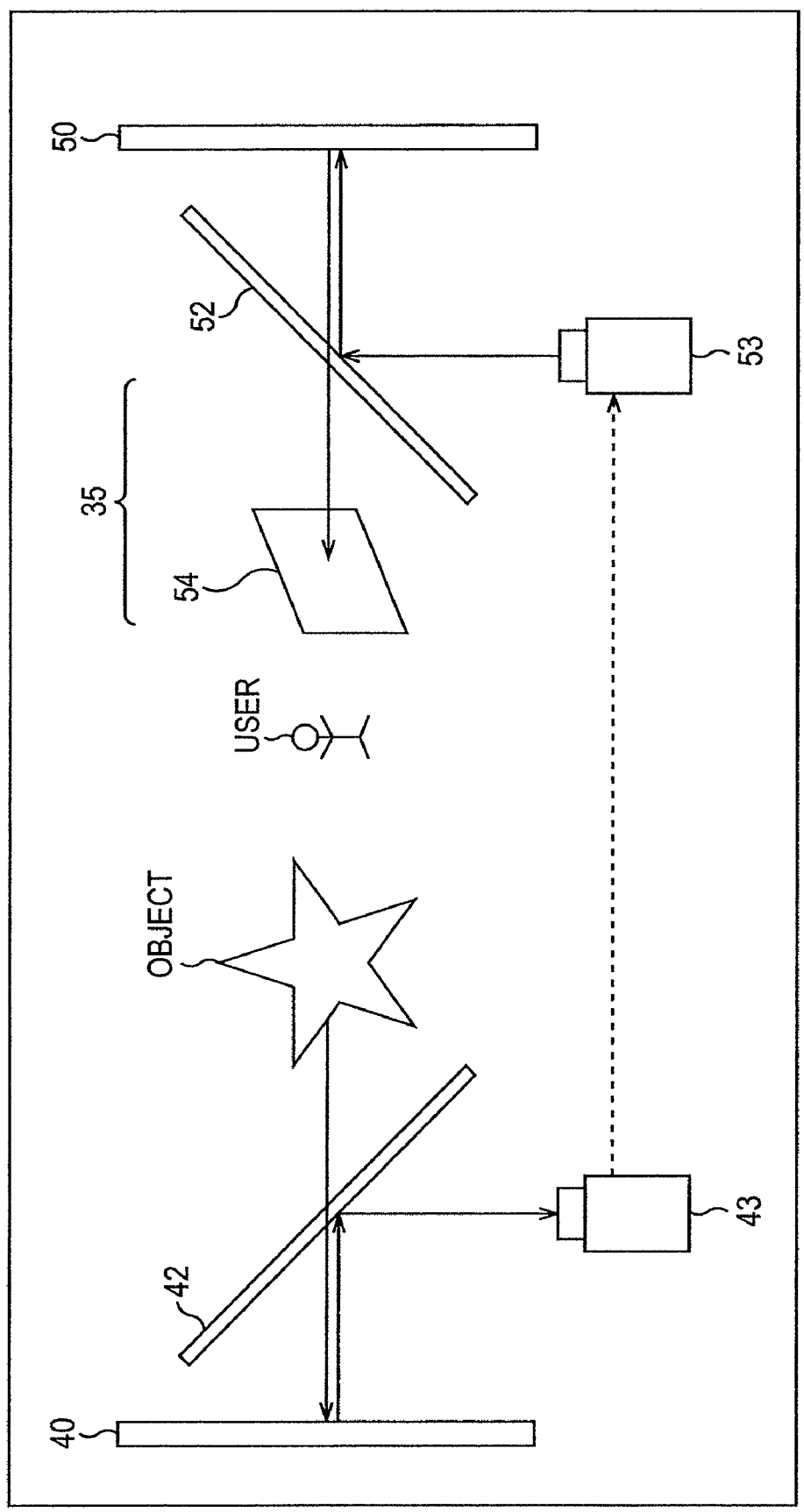
FIG. 7 is a cross-sectional view of the image-capturing optical unit 21 and the display optical unit 32 according to the first embodiment.

FIG. 6 is a perspective view of the image-capturing optical unit 21 and the display optical unit 32 according to a first embodiment, and FIG. 7 is a cross-sectional view of FIG. 6.

As shown in FIG. 6, in the first embodiment, the image-capturing unit 22, for example, is a camera 43 for capturing an image of an object, and the display unit 31, for example, is a projector 53 for emitting a light beam corresponding to the image.

Referring to FIGS. 6 and 7, the image-capturing optical unit 21 in the first embodiment includes a prismatic-mirror assembly 40 and a half mirror 42.

The prismatic-mirror assembly 40 includes a plurality of arrayed prismatic mirrors 41. In detail, each of the prismatic mirrors 41 is rotatable about a rotary axis extending between the central points of its two end surfaces. Accordingly, the prismatic-mirror assembly 40 is formed of the plurality of prismatic mirrors 41 arrayed parallel to one another in the same plane while the rotary axes extend in the vertical direction.

Based on the control operation by the controller 24, the driver 23 rotates the prismatic mirrors 41 of the prismatic-mirror assembly 40 in phase with one another and at a constant angular rate.

The half mirror 42 is disposed to the right of the prismatic-mirror assembly 40 while a reflective surface of the half mirror 42 is disposed at a 45° angle with respect to the plane in which the prismatic mirrors 41 of the prismatic-mirror assembly 40 are arrayed.

The camera 43 is disposed below the half mirror 42 such that the optical axis of the camera 43 is parallel to each of the rotary axes of the prismatic mirrors 41 of the prismatic-mirror assembly 40. Moreover, an object is disposed to the right of the half mirror 42 such that the half mirror 42 intervenes the object and the prismatic-mirror assembly 40.

Furthermore, the display optical unit 32 according to the first embodiment in FIGS. 6 and 7 includes a prismatic-mirror assembly 50 and a half mirror 52.

The prismatic-mirror assembly 50 has the same structure as the prismatic-mirror assembly 40 in the image-capturing optical unit 21, and moreover, the prismatic-mirror assembly 50 and the half mirror 52 are positioned in a similar manner as the prismatic-mirror assembly 40 and the half mirror 42 in the image-capturing optical unit 21.

In other words, the prismatic-mirror assembly 50 includes a plurality of arrayed prismatic mirrors 51. Specifically, each of the prismatic mirrors 51 is rotatable about a rotary axis extending between the central points of its two end surfaces. Accordingly, the prismatic-mirror assembly 50 is formed of the plurality of prismatic mirrors 51 arrayed parallel to one another in the same plane while the rotary axes extend in the vertical direction.

Based on the control operation by the controller 34, the driver 33 rotates the prismatic mirrors 51 of the prismatic-mirror assembly 50 in phase with one another and at a constant angular rate.

The half mirror 52 is disposed to the left of the prismatic-mirror assembly 50 while a reflective surface of the half mirror 52 is disposed at a 45° angle with respect to the plane in which the prismatic mirrors 51 of the prismatic-mirror assembly 50 are arrayed.

The projector 53 is disposed below the half mirror 52 such that the optical axis of the projector 53 is parallel to each of the rotary axes of the prismatic mirrors 51 of the prismatic-mirror assembly 50.

The image-capturing apparatus 11 having the image-capturing optical unit 21 and the display apparatus 12 having the display optical unit 32, respectively, perform the image-capturing operation and the display operation in the following manner.

Referring to FIG. 7, according to the image-capturing apparatus 11, a light beam from the object (namely, a light beam reflected from the illuminated object) is transmitted through the half mirror 42 and enters the prismatic-mirror assembly 40. The prismatic-mirror assembly 40 reflects the light beam from the object back towards the half mirror 42. The half mirror 42 then reflects the light beam from the prismatic-mirror assembly 40 towards the camera 43 acting as the image-capturing unit 22. The camera 43 receives the reflected light beam so as to capture the image of the object.

On the other hand, in the display apparatus 12, the projector 53 emits a light beam corresponding to the image of the object captured by the camera 43 in the image-capturing apparatus 11, as mentioned above, and the light beam enters the half mirror 52. The half mirror 52 reflects the light beam from the projector 53 towards the prismatic-mirror assembly 50. The prismatic-mirror assembly 50 then reflects the light beam from the half mirror 52 such that the reflected light beam enters the half mirror 52. The half mirror 52 transmits the reflected light beam from the prismatic-mirror assembly 50 such that the transmitted light beam enters the diffuser 35.

According to the first embodiment shown in FIG. 7, the diffuser 35 is, for example, a screen panel 54 formed of flat, ground glass. A user may hold the screen panel 54 at any position at a side of the half mirror 52 opposite to the side on which the prismatic-mirror assembly 50 is disposed. By holding up the screen panel 54 towards the half mirror 52 and viewing the screen panel 54, the user can see the image of the object.

Specifically, the light beam reflected by the prismatic-mirror assembly 50 and transmitted through the half mirror 52 is received and diffused by the screen panel 54 held by the user. Thus, the screen panel 54 displays the image corresponding to the light beam, namely, the image of the object captured by the camera 43.

According to the diffuser 35 in the first embodiment in FIG. 7, the screen panel 54 can be moved while being held by the user. Alternatively, the diffuser 35 may be a fixed screen.

Figure 8:
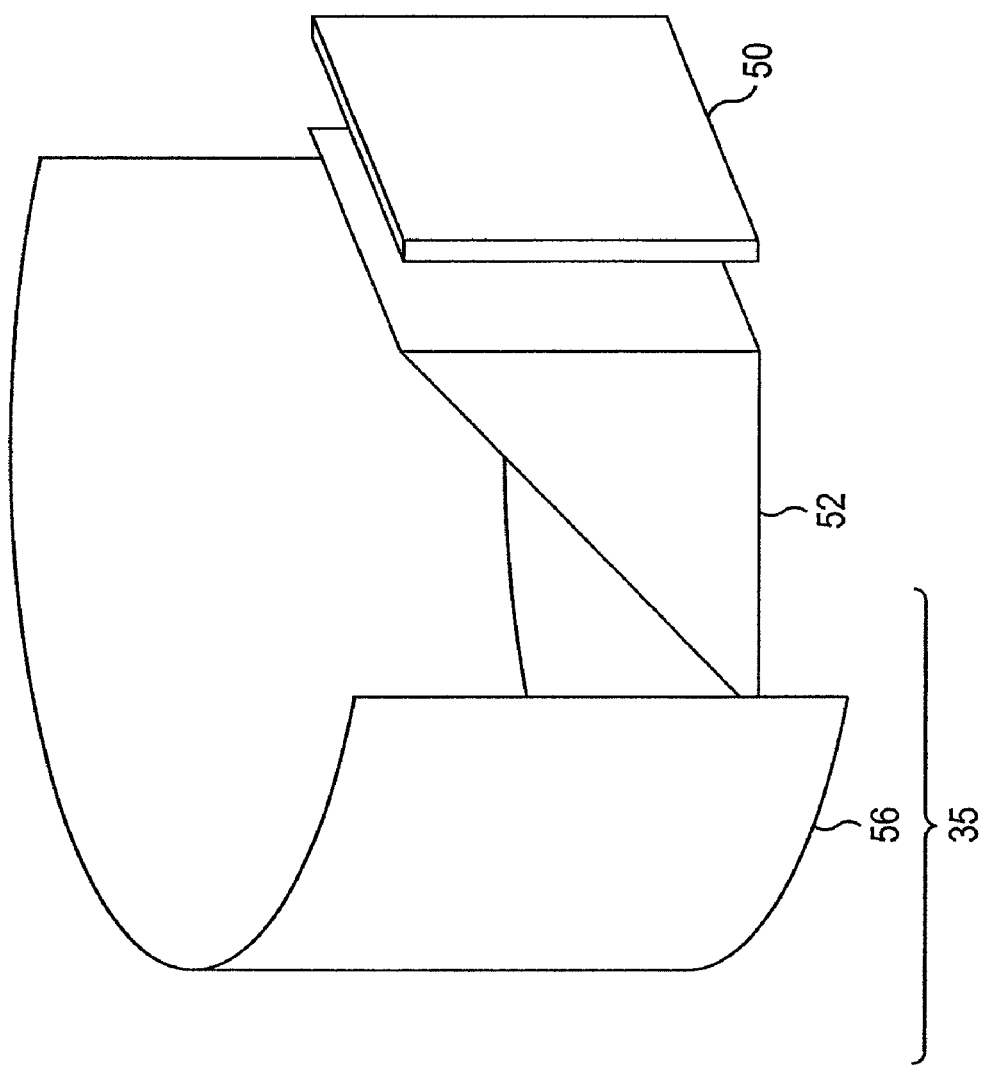
FIG. 8 is a perspective view of a diffuser 35 formed of a cylindrical screen panel 56.

For example, as shown in FIG. 8, the diffuser 35 may be a cylindrical screen panel 56 formed by bowing a flat screen panel. The cylindrical screen panel 56 covers the half mirror 52 in the horizontal direction.

Figure 9:
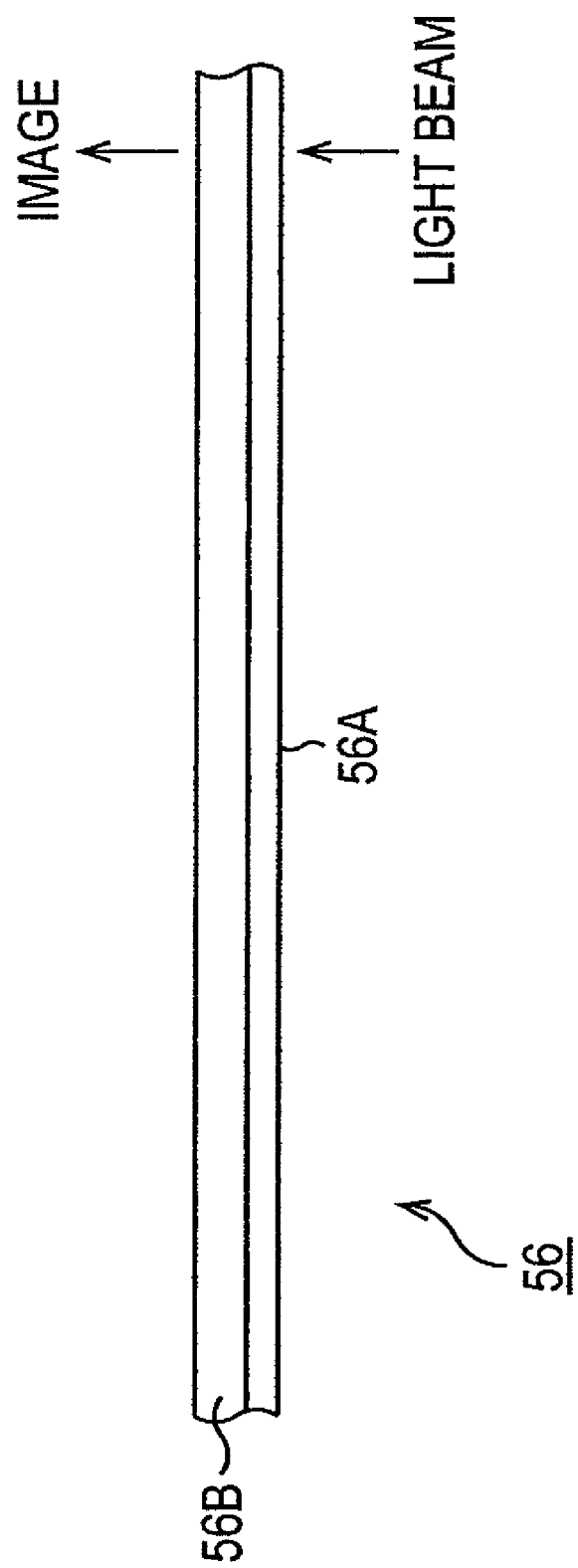
FIG. 9 is a cross-sectional view of the cylindrical screen panel 56.

FIG. 9 illustrates an example of the structure of the cylindrical screen panel 56. Specifically, FIG. 9 is a partial cross-sectional view of the cylindrical screen panel 56.

According to the example shown in FIG. 9, the cylindrical screen panel 56 includes a diffusive plate 56B and an optical-filter film 56A. The diffusive plate 56B diffuses light and is disposed on the outer side of the cylindrical screen panel 56 (the side opposite to the side adjacent to the half mirror 52). On the other hand, the optical-filter film 56A is disposed on the inner side (the side adjacent to the half mirror 52).

Figure 10:
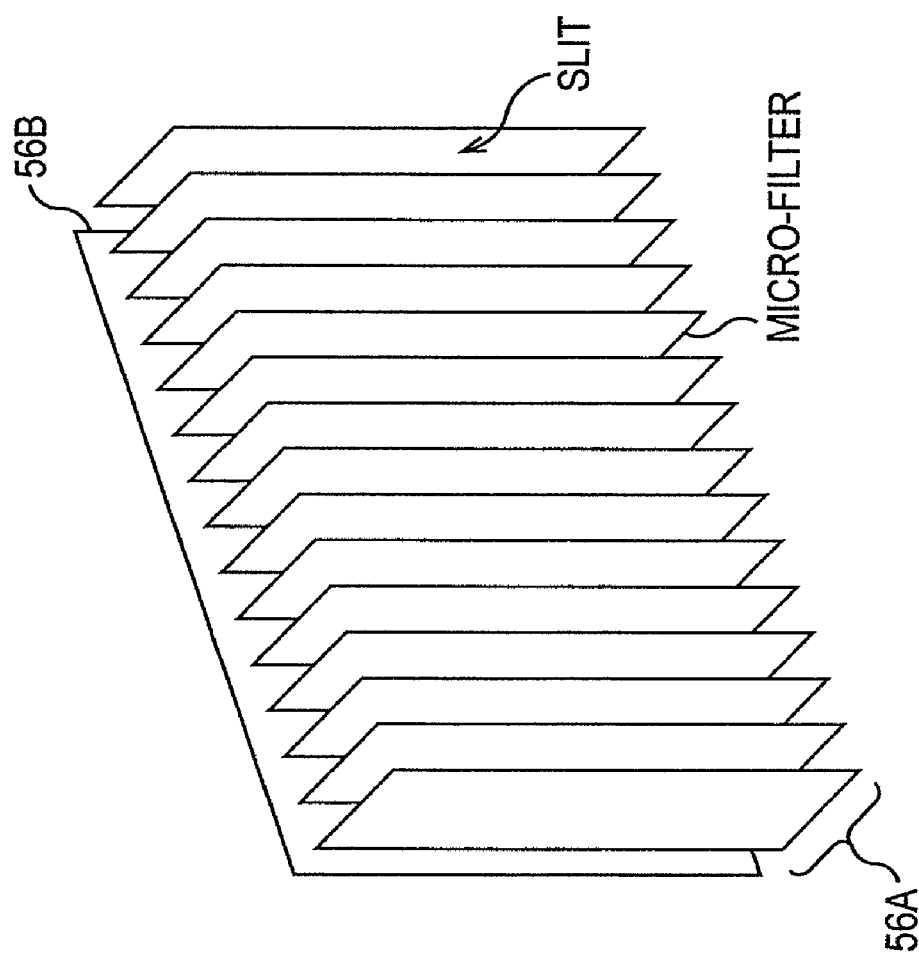
FIG. 10 is a perspective view of an optical-filter film 56A.

For example, as shown in FIG. 10 in a perspective view, the optical-filter film 56A is a sheet-like optical filter having a louver-type structure. In detail, the optical-filter film 56A includes multiple fine rectangular film components that block light. The fine film components are disposed at short intervals such that the surfaces of the fine film components face each other. This forms slits between the adjacent fine film components.

Figure 11:
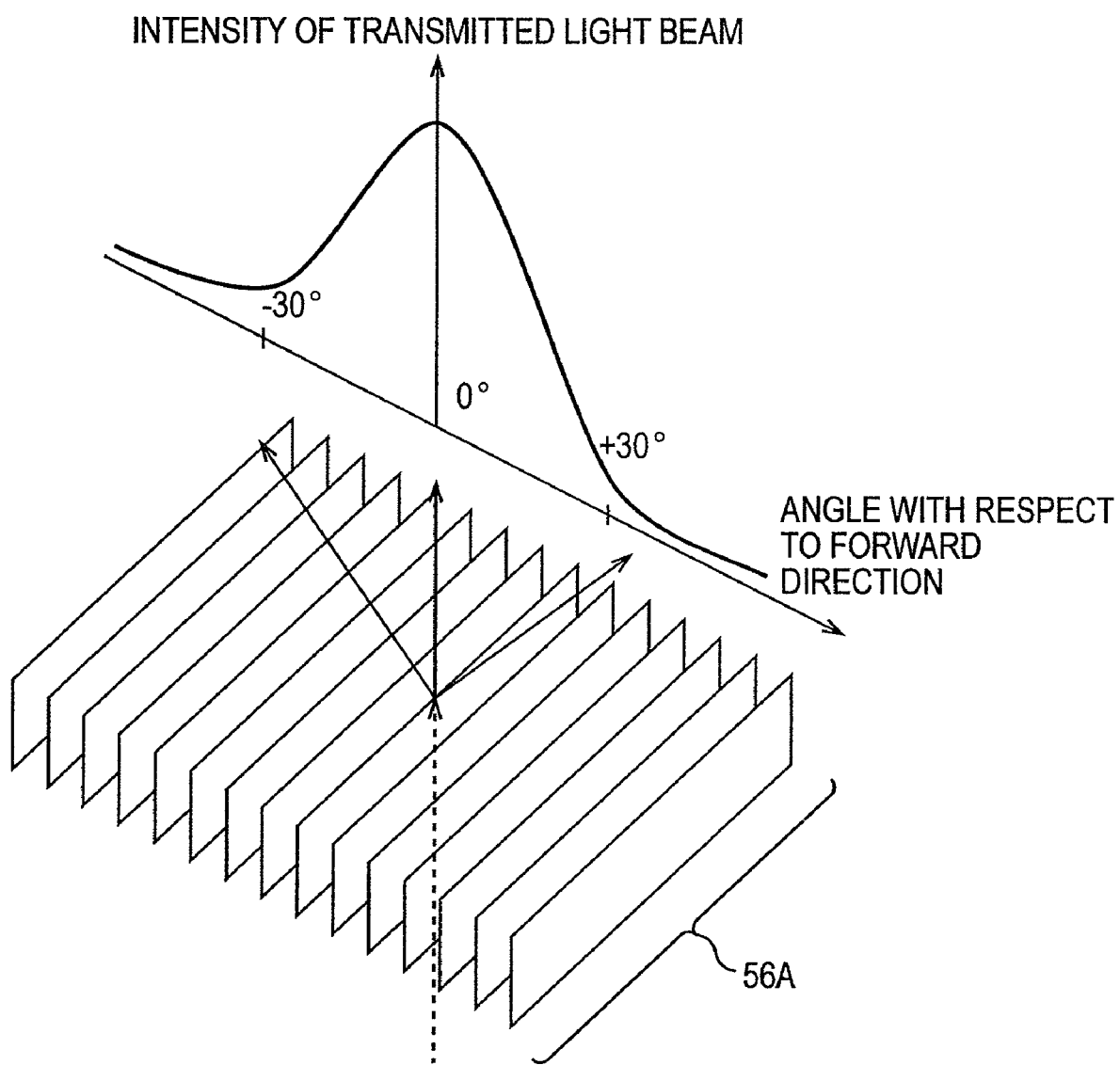
FIG. 11 illustrates the optical characteristics of the optical-filter film 56A.

Referring to FIG. 11, if a direction parallel to the surfaces of the multiple fine film components of the optical-filter film 56A is defined as the forward direction, the optical-filter film 56A has an optical characteristic shown in the drawing.

In detail, the optical-filter film 56A has an optical characteristic that directly transmits light beam components traveling only in the forward direction, while reducing the light intensity of the transmitting beam components deviated from the forward direction (beam components that are incident on the surfaces of the fine film components). Accordingly, when the optical-filter film 56A is viewed in the forward direction, the opposite side is viewable, whereas if the optical-filter film 56A is viewed in a direction deviated from the forward direction (viewed at an angle), the opposite side is not viewable.

For the optical-filter film 56A having the above-mentioned optical characteristic, a Light Control Film manufactured by Sumitomo 3M Ltd., for example, may be used.

In the cylindrical screen panel 56 shown in FIG. 9, the optical-filter film 56A having the above-mentioned optical characteristic is disposed on the inner side of the cylindrical screen panel 56 such that the slits are arranged side by side in the vertical direction.

Accordingly, when light beam components from the half mirror 52 enter the cylindrical screen panel 56, the beam components entering at an incident angle of 90° with respect to the cylindrical screen panel 56 are transmitted through the optical-filter film 56A, whereas the beam components entering at other incident angles are (ideally all) blocked by the optical-filter film 56A. As a result, only the beam components entering at an incident angle of 90° with respect to the cylindrical screen panel 56 reach the diffusive plate 56B disposed on the outer side of the cylindrical screen panel 56, meaning that an image corresponding to such beam components is (ideally) displayed on the outer side of the cylindrical screen panel 56.

Figure 12A:
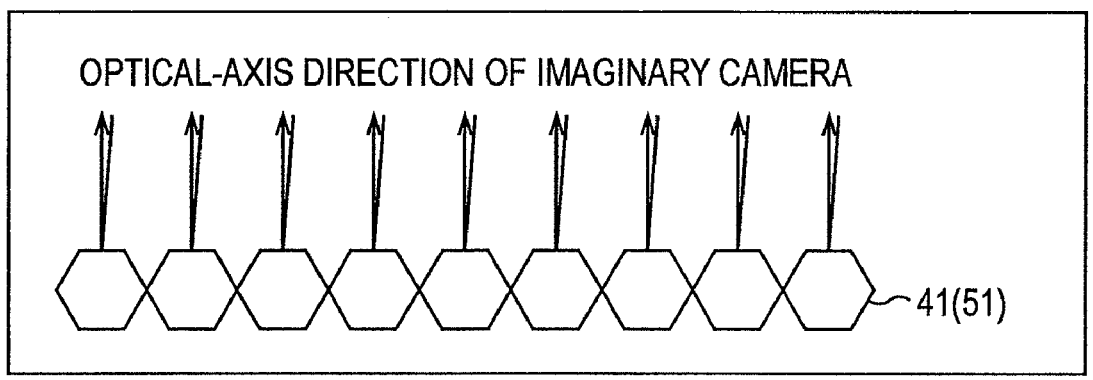
FIG. 12A is a top view of a first example of a prismatic-mirror assembly 40.
Figure 12B:
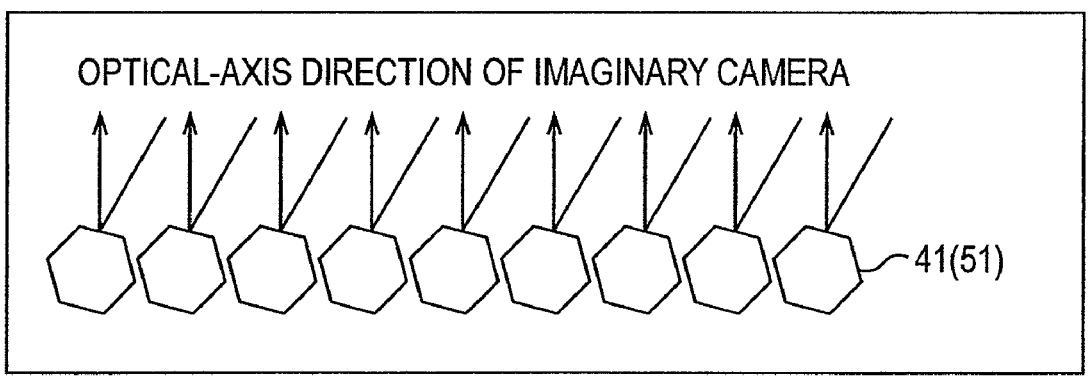
FIG. 12B is another top view of the first example of the prismatic-mirror assembly 40.
Figure 12C:
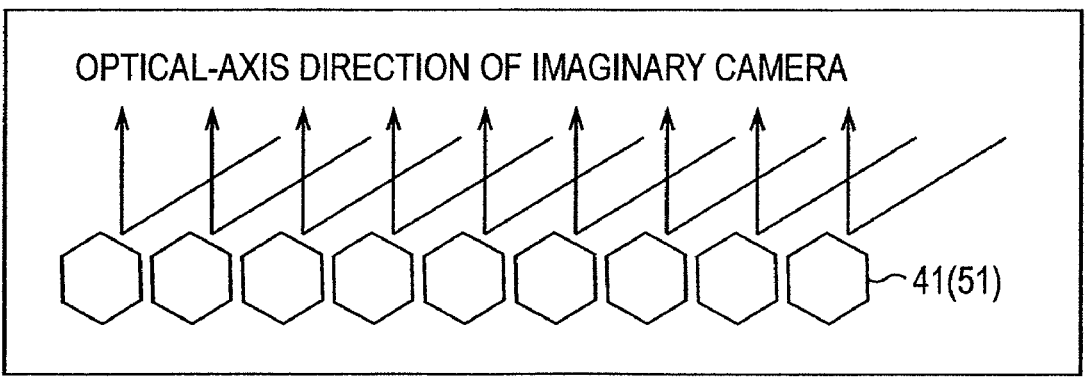
FIG. 12C is another top view of the first example of the prismatic-mirror assembly 40.

FIGS. 12A to 12C are top views each illustrating a first example of the structure of the prismatic-mirror assembly 40 in FIGS. 6 and 7.

According to the first example in FIGS. 12A to 12C, each of the prismatic mirrors 41 of the prismatic-mirror assembly 40 is a regular-hexagonal prismatic mirror and is capable of reflecting light beams incident on each of its sides.

Furthermore, as mentioned previously, the prismatic mirrors 41 are rotated in phase with one another at the same angular rate.

Here, in the first embodiment in FIG. 7, it is assumed that a camera is imaginarily disposed (referred to as an imaginary camera hereinafter) in place of the half mirror 42 at a position that is line-symmetrical to the camera 43. In such a case, assuming that the half mirror 42 is not present, the imaginary camera receiving a light beam reflected by the prismatic-mirror assembly 40 is optically equivalent to the camera 43 receiving a light beam reflected by the prismatic-mirror assembly 40 and the half mirror 42.

To provide an easier explanation, the imaginary camera will be used to describe the relationship between the image of an object captured by receiving a light beam reflected by the prismatic-mirror assembly 40 and the rotation of the prismatic mirrors 41 of the prismatic-mirror assembly 40.

For example, the imaginary camera receives light beam components in a direction parallel to the optical axis of the imaginary camera so as to capture the image corresponding to the beam components.

Accordingly, as shown in FIG. 12A, if each of the surfaces of the rotating prismatic mirrors 41 faces the imaginary camera such that each of the normal lines of the surfaces is substantially aligned with the optical axis of the imaginary camera, the light beam components entering the prismatic mirrors 41 in a direction substantially aligned with the optical-axis direction of the imaginary camera are reflected in the optical-axis direction of the imaginary camera.

Furthermore, as shown in FIG. 12B, in a case where each of the surfaces of the rotating prismatic mirrors 41 faces slightly towards the right with respect to the optical axis of the imaginary camera, the light beam components entering the prismatic mirrors 41 at an angle leaning slightly towards the right with respect to the optical axis of the imaginary camera are reflected in the optical-axis direction of the imaginary camera.

Moreover, as shown in FIG. 12C, in a case where each of the surfaces of the rotating prismatic mirrors 41 faces significantly towards the right with respect to the optical axis of the imaginary camera, the light beam components entering the prismatic mirrors 41 at an angle leaning significantly towards the right with respect to the optical axis of the imaginary camera are reflected in the optical-axis direction of the imaginary camera.

Accordingly, the direction of the light beam components from an object subject to be received by the imaginary camera varies depending on the leaning angle of the surfaces of the prismatic mirrors 41. According to the first example shown in FIGS. 12A to 12C, if the prismatic mirrors 41 are in a state shown in FIG. 12A, some of the light beam components from the object entering the prismatic mirrors 41 in a direction substantially aligned with the optical axis of the imaginary camera are reflected by the prismatic mirrors 41 in the optical-axis direction of an imaginary camera 41 so as to be received by the imaginary camera. As a result, assuming that the direction from which the object is viewed along the optical axis of the imaginary camera from the side of the prismatic-mirror assembly 40 in FIG. 7 is the forward direction, if the prismatic mirrors 41 are in the state shown in FIG. 12A, the imaginary camera captures the image of the object substantially equivalent to what can be seen from the front direction.

On the other hand, if the prismatic mirrors 41 are in a state shown in FIG. 12B, some of the light beam components from the object entering the prismatic mirrors 41 at an angle leaning slightly towards the right with respect to the optical axis of the imaginary camera are reflected in the optical-axis direction of the imaginary camera so as to be received by the imaginary camera. As a result, when the prismatic mirrors 41 are in the state shown in FIG. 12B, the imaginary camera captures the image of the object as what can be seen from an angle slightly towards the left with respect to the front direction.

Furthermore, if the prismatic mirrors 41 are in a state shown in FIG. 12C, some of the light beam components from the object entering the prismatic mirrors 41 at an angle leaning significantly towards the right with respect to the optical axis of the imaginary camera are reflected in the optical-axis direction of the imaginary camera so as to be received by the imaginary camera. As a result, when the prismatic mirrors 41 are in the state shown in FIG. 12C, the imaginary camera captures the image of the object as what can be seen from an angle significantly towards the left with respect to the front direction.

Accordingly, as shown in FIGS. 12A to 12C, the prismatic mirrors 41 of the prismatic-mirror assembly 40, for example, rotate counterclockwise, and moreover, if the surfaces of each prismatic mirror 41 are not different from one another and the rotating prismatic mirrors 41, for example, take the same orientation every four frames, the imaginary camera is capable of capturing images of an object as seen from four angles for every four frames.

As a result, if the imaginary camera is, for example, an NTSC (National Television System Committee) camera having a frame rate of 30 frames-per-second, the imaginary camera is capable of capturing an image of an object from each of four angles at a frame rate of 7.5 frames per second (=(30 frames per second)/4).

Accordingly, the imaginary camera, that is, the camera 43 of the image-capturing apparatus 11, is capable of capturing images of an object in multiple frame units as seen from multiple viewing angles in the horizontal direction. Thus, the image-capturing apparatus 11 captures images of an object as seen from multiple viewing angles in the horizontal direction while sacrificing the time resolution (frame rate). As a result, full-parallax images having high spatial resolution can be captured in real time while allowing selectable viewpoints of the images to be viewed in the horizontal direction.

The images captured by the image-capturing apparatus 11 may either be monochrome or color.

Since the hexagonal prismatic mirrors 41 take the same orientation every four frames, it is necessary to rotate the prismatic mirrors 41 at an angular rate that allows each prismatic mirror 41 to make a complete turn at 24 frames (=6×4).

Consequently, in a case where the hexagonal prismatic mirrors 41, for example, take the same orientation for every five frames so as to allow images of an object to be captured as seen from five angles, the prismatic mirrors 41 must be rotated at an angular rate that allows each prismatic mirror 41 to make a complete turn at 30 frames (=6×5). In this case, with an NTSC camera, for example, the image of an object from each of five angles is captured at a frame rate of 6 frames per second (=30/5).

On the other hand, the prismatic-mirror assembly 50 in the display apparatus 12, as mentioned above, has a similar structure to that of the prismatic-mirror assembly 40 in the image-capturing apparatus 11, and moreover, the prismatic mirrors 51 of the prismatic-mirror assembly 50 and the prismatic mirrors 41 of the prismatic-mirror assembly 40 are in phase with each other and are rotated at the same angular rate.

Thus, if the prismatic-mirror assembly 40 in the image-capturing apparatus 11 has the structure shown in FIGS. 12A to 12C, the prismatic-mirror assembly 50 in the display apparatus 12 similarly has the structure illustrated in FIGS. 12A to 12C.

Like the imaginary camera used for explaining the operation of the image-capturing apparatus 11, it is assumed that the display apparatus 12 is imaginarily provided with an imaginary projector (referred to as an imaginary projector hereinafter).

In detail, in the first embodiment in FIG. 7, it is assumed that the imaginary projector is disposed in place of the half mirror 52 at a position that is line-symmetrical to the projector 53. Assuming that the half mirror 52 is not present, a light beam emitted from the imaginary projector enters the prismatic-mirror assembly 50 and is reflected by the prismatic-mirror assembly 50. In such a case, the imaginary projector emitting a light beam which is to be reflected by the prismatic-mirror assembly 50 is optically equivalent to the projector 53 emitting a light beam which is to be reflected by the half mirror 52 and the prismatic-mirror assembly 50 and be transmitted through the half mirror 52.

To provide an easier explanation, the imaginary projector will be used to describe the relationship between an image of an object displayed by emitting a light beam reflected by the prismatic-mirror assembly 50 and the rotation of the prismatic mirrors 51 of the prismatic-mirror assembly 50.

As illustrated in FIGS. 12A to 12C, the imaginary projector emits light beam components corresponding to the captured image of the object as seen from each of the viewing angles. The light beam components are emitted in a direction parallel to the optical axis of the imaginary projector. Moreover, the light beam components emitted from the imaginary projector enter the prismatic-mirror assembly 50 where they are reflected.

The prismatic mirrors 51 of the prismatic-mirror assembly 50 are in phase with the prismatic mirrors 41 of the prismatic-mirror assembly 40 and are rotated at the same angular rate. Thus, the light beam components emitted from the imaginary projector travel in a direction opposite to the direction of the optical paths shown in FIGS. 12A to 12C, and are reflected by the prismatic mirrors 51.

Accordingly, in FIG. 7, in a case where a user holds up the screen panel 54 towards the imaginary projector (or the prismatic-mirror assembly 50) from a position where the user is substantially aligned with the optical axis of the imaginary projector, if the prismatic mirrors 51 are in a state shown in FIG. 12A, some of the light beam components emitted from the imaginary projector are reflected by the prismatic mirrors 51 so as to trace back the optical path of the light beam components shown in FIG. 12A. The light beam components are then received by the screen panel 54. As a result, when the prismatic mirrors 41 are in the state shown in FIG. 12A, the screen panel 54 displays the image of the object captured by the imaginary camera, that is, the image of the object substantially equivalent to what can be seen from the front direction.

On the other hand, in a case where the user holds up the screen panel 54 towards the imaginary projector from an angle slightly towards the left with respect to the optical axis of the imaginary projector, if the prismatic mirrors 51 are in the state shown in FIG. 12B, some of the light beam components emitted from the imaginary projector are reflected by the prismatic mirrors 51 so as to trace back the optical path of the light beam components shown in FIG. 12B. The light beam components are then received by the screen panel 54. As a result, when the prismatic mirrors 41 are in the state shown in FIG. 12B, the screen panel 54 displays the image of the object captured by the imaginary camera, that is, the image of the object as seen from an angle slightly towards the left with respect to the front direction.

Furthermore, in a case where the user holds up the screen panel 54 towards the imaginary projector from an angle significantly shifted towards the left with respect to the optical axis of the imaginary projector, if the prismatic mirrors 51 are in the state shown in FIG. 12C, some of the light beam components emitted from the imaginary projector are reflected by the prismatic mirrors 51 so as to trace back the optical path of the light beam components shown in FIG. 12C. The light beam components are then received by the screen panel 54. As a result, when the prismatic mirrors 41 are in the state shown in FIG. 12C, the screen panel 54 displays the image of the object captured by the imaginary camera, that is, the image of the object as seen from an angle significantly shifted towards the left with respect to the front direction.

Accordingly, the user is able to view the image of an object from each angle as if the user is seeing the actual object from that particular angle. Thus, similar to the image-capturing apparatus 11, the display apparatus 12 displays images of an object as seen from multiple viewing angles in the horizontal direction while sacrificing the time resolution. Consequently, full-parallax images having high spatial resolution can be viewed by the user in real time while allowing selectable viewpoints of the images to be viewed by the user in the horizontal direction.

The images displayed by the display apparatus 12 may either be monochrome or color. Furthermore, the images displayed by the display apparatus 12 may be the actual images captured by the image-capturing apparatus 11 or images of, for example, computer graphics or animation. When using computer graphics or animation, the images from multiple viewpoints, like the images obtained by the image-capturing apparatus 11 while sacrificing the time resolution, must be images disposed at every predetermined number of frames.

As described previously, the image-capturing apparatus 11 captures images of an object as seen from multiple viewing angles in the horizontal direction while sacrificing the time resolution. Consequently, if the number of selectable viewing angles is to be increased the time resolution may deteriorate. This means that in order to maintain the time resolution at a certain level, the number of selectable viewing angles has to be limited. Accordingly, the number of selectable viewing angles and the time resolution are preferably set in view of, for example, the properties of the object.

For example, if the object hardly moves, it is possible to increase the number of selectable viewing angles while sacrificing the time resolution. On the other hand, if the object moves significantly, for example, it is preferable to limit the number of selectable viewing angles to a level such that the time resolution can be sufficiently maintained.

Furthermore, although the prismatic mirrors 41 are regular-hexagonal prismatic mirrors in the first example in FIGS. 12A to 12C, the prismatic mirrors 41 may be other prismatic mirrors having an alternative shape.

Figure 13A:
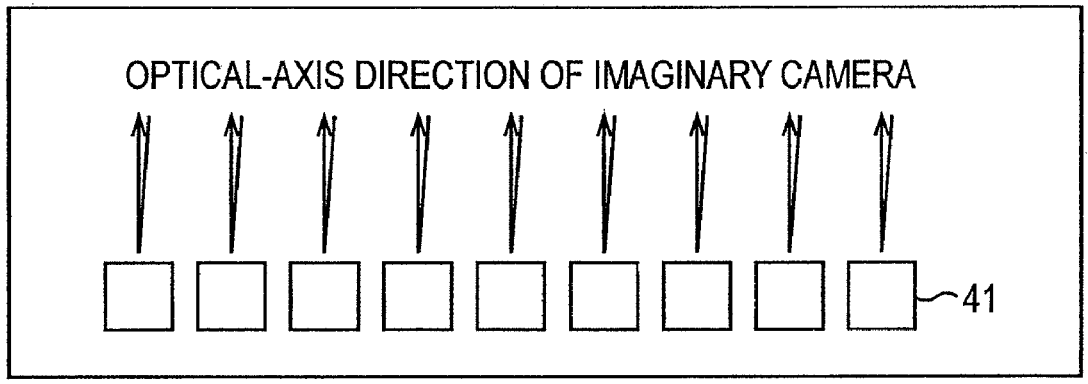
FIG. 13A is a top view of a second example of the prismatic-mirror assembly 40.
Figure 13B:
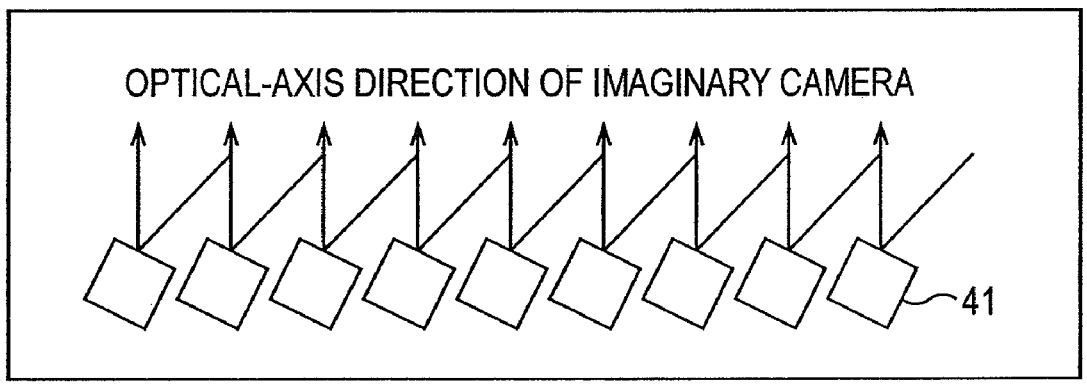
FIG. 13B is another top view of the second example of the prismatic-mirror assembly 40.
Figure 13C:
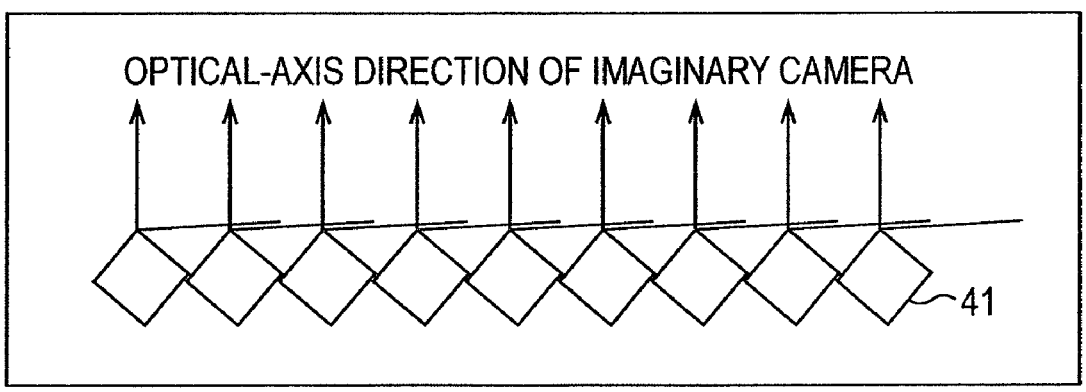
FIG. 13C is another top view of the second example of the prismatic-mirror assembly 40.

For example, as shown in FIGS. 13A to 13C, each of the prismatic mirrors 41 may be a prismatic mirror whose end surfaces are square-shaped. If each prismatic mirror 41 is a prismatic mirror whose end surfaces are square-shaped as shown in FIGS. 13A to 13C, the prismatic mirrors 41 may be rotated as shown in FIGS. 13A, 13B, and 13C so that the camera 43 can capture images of an object as seen from multiple viewing angles in the horizontal direction in the same manner as in FIGS. 12A to 12C.

If the prismatic mirrors 41 in the image-capturing apparatus 11 have the structure shown in FIGS. 13A to 13C, the prismatic mirrors 51 in the display apparatus 12 must have the same structure as the prismatic mirrors 41, in which the end surfaces of each prismatic mirror are square-shaped.

Furthermore, the prismatic mirrors 41 and 51 may have other alternative shapes, such as a triangular prism.

FIG. 14 is a perspective view of the image-capturing optical unit 21 and the display optical unit 32 according to a second embodiment.

According to the second embodiment in FIG. 14, the image-capturing optical unit 21 includes a lens plate 60 and a slit plate 62.

As shown in FIGS. 15A and 15B, the lens plate 60 is a lenticular-lens assembly including a plurality of arrayed semi-cylindrical lenses 61. Specifically, the lens plate 60 is a lenticular-lens assembly in which the semi-cylindrical lenses 61 are arrayed parallel to one another in the same plane while extending longitudinally in the vertical direction.

FIG. 15A is a plan view of the lens plate 60, and FIG. 15B is a cross-sectional view taken along a line extending horizontally through the lens plate 60 in FIG. 15A.

The refracting direction (angle of refraction) of a light beam according to the semi-cylindrical lenses 61 varies depending on the incident point of the light beam. For this reason, when an object is viewed through the lens plate 60, i.e. the lenticular-lens assembly, each of the semi-cylindrical lenses 61 shows the image of the object at a wide angle of view. Moreover, as shown in FIG. 15B with slant lines, each semi-cylindrical lens 61 shows the image of the object as seen from the position of that particular semi-cylindrical lens 61.

In the second embodiment in FIG. 14, based on the control operation by the controller 24, the driver 23 drives the lens plate 60 so that the semi-cylindrical lenses 61 of the lens plate 60 move in a periodical manner. Specifically, in the second embodiment in FIG. 14, the driver 23 periodically oscillates the lens plate 60 in the horizontal direction.

The slit plate 62 is disposed to the right of the lens plate 60 while being substantially in contact with the lens plate 60. The slit plate 62 includes a plurality of slits 62A aligned with the semi-cylindrical lenses 61 in the longitudinal direction, i.e. the vertical direction. In contrast to the oscillating lens plate 60 mentioned above, the slit plate 62 is fixed. Moreover, the slits 62A are disposed at, for example, the same interval as the semi-cylindrical lenses 61.

The object is disposed adjacent to a side of the lens plate 60 opposite to the side with the slit plate 62. The camera 43 acting as the image-capturing unit 22 is disposed to the right of the slit plate 62 such that the optical axis of the camera 43 is perpendicular to the lens plate 60 and the slit plate 62.

The lens plate 60 and the slit plate 62 each have a size that, for example, sufficiently covers the angle of field of the camera 43.

Furthermore, in the second embodiment in FIG. 14, the display optical unit 32 includes a lens plate 70 and a slit plate 72.

The lens plate 70 and the slit plate 72, respectively, have the same structure as the lens plate 60 and the slit plate 62 of the image-capturing optical unit 21. Moreover, the lens plate 70 and the slit plate 72 are respectively positioned in the same manner as the lens plate 60 and the slit plate 62 of the image-capturing optical unit 21.

In other words, like the lens plate 60 shown in FIGS. 15A and 15B, the lens plate 70 is also a lenticular-lens assembly including a plurality of semi-cylindrical lenses 71 which are arrayed parallel to one another in the same plane while extending longitudinally in the vertical direction.

According to the second embodiment in FIG. 14, like the driver 23, the driver 33 periodically oscillates the lens plate 70 in the horizontal direction based on the control operation by the controller 34. Here, the driver 33 oscillates the lens plate 70 in phase with the lens plate 60 at the same period.

The phases of the lens plate 60 in the image-capturing apparatus 11 and the lens plate 70 in the display apparatus 12 can be considered as, for example, the respective positions of the lens plate 60 and the lens plate 70 viewed from the object.

The slit plate 72 is disposed to the left of the lens plate 70 while being substantially in contact with the lens plate 70. Moreover, the slit plate 72 includes a plurality of slits similar to the slits 62A disposed in the slit plate 62, such that the slits extend in the vertical direction. In contrast to the oscillating lens plate 70 mentioned above, the slit plate 72 is fixed.

Furthermore, the projector 53 acting as the display unit 31 is disposed to the left of the slit plate 72 such that the optical axis of the projector 53 is perpendicular to the lens plate 70 and the slit plate 72.

According to the second embodiment in FIG. 14, a user may view an image via the screen panel 54 (FIG. 7) acting as the diffuser 35 at a side of the lens plate 70 opposite to the side where the slit plate 72 is disposed.

Furthermore, the lens plate 70 and the slit plate 72 each have a size that, for example, sufficiently covers the angle of field of an image corresponding to a light beam emitted from the projector 53.

The image-capturing apparatus 11 having the image-capturing optical unit 21 and the display apparatus 12 having the display optical unit 32 according to the second embodiment respectively perform the image-capturing operation and the image display operation in the following manner.

In the image-capturing apparatus 11, a light beam from the object is transmitted through the lens plate 60 and the slits 62A of the slit plate 62, and enters the camera 43. The camera 43 receives the light beam so as to capture the image of the object.

On the other hand, in the display apparatus 12, the projector 53 emits a light beam corresponding to the image of the object captured by the camera 43 in the image-capturing apparatus 11. The light beam is then transmitted through the lens plate 70 and the slits of the slit plate 72. The light beam transmitted through the slits of the slit plate 72 is received by the screen panel 54 (FIG. 7) acting as the diffuser 35 held by the user. Thus, the image corresponding to the light beam is displayed.

Figure 16A:
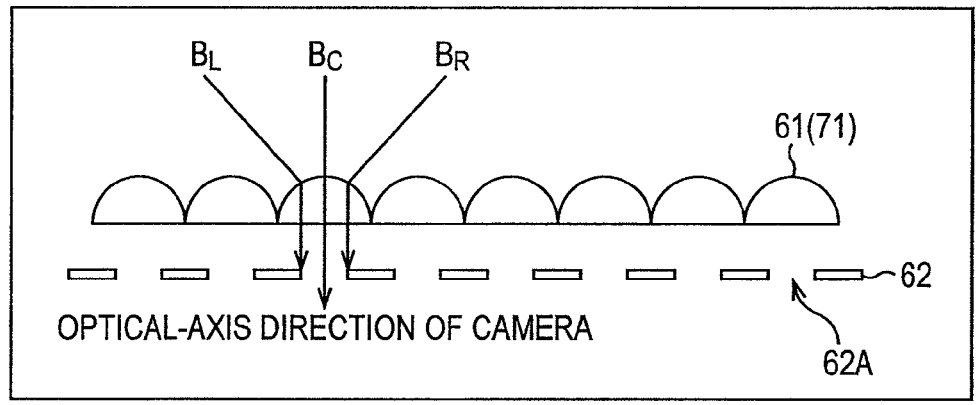
FIG. 16A illustrates a light beam being transmitted through the lens plate 60 and a slit plate 62.
Figure 16B:
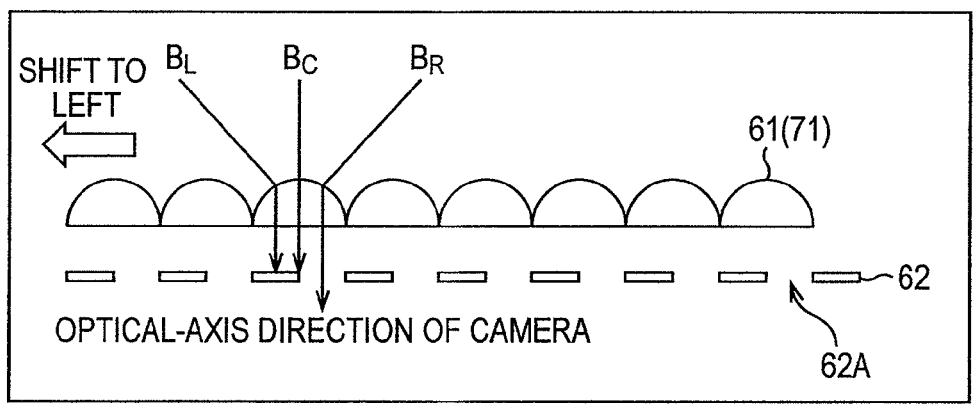
FIG. 16B illustrates a light beam being transmitted through the lens plate 60 and the slit plate 62.
Figure 16C:
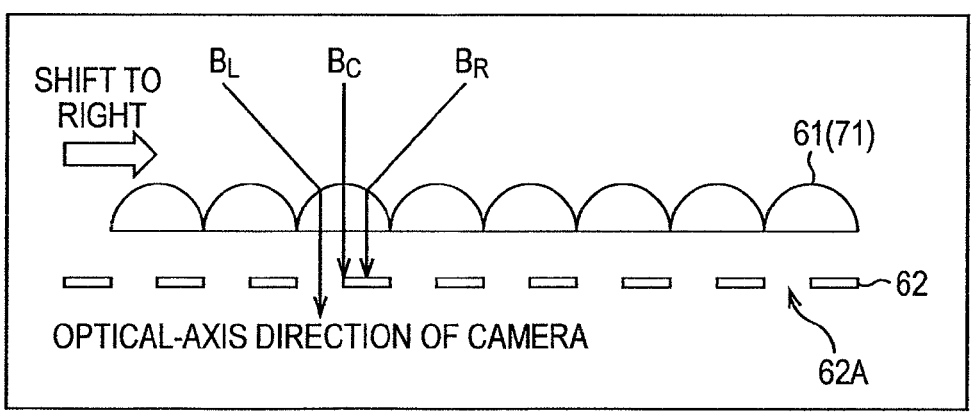
FIG. 16C illustrates a light beam being transmitted through the lens plate 60 and the slit plate 62.

Referring to FIGS. 16A to 16C, the relationship between the image of the object captured by the camera 43 by receiving the light beam transmitted through the lens plate 60 and the slits 62A of the slit plate 62 and the position of the semi-cylindrical lenses 61 of the lens plate 60 will be described. FIGS. 16A to 16C are cross-sectional views each taken along a line extending horizontally through the lens plate 60 and the slit plate 62.

For example, as shown in FIG. 16A, when the semi-cylindrical lenses 61 are positioned at the center of the horizontal-oscillation range, the beam components of the light beam from the object incident on each semi-cylindrical lens 61 are aligned with the optical axis of the camera 43. The beam components are then transmitted through the corresponding semi-cylindrical lens 61 and enter the slit plate 62. Of all the beam components transmitted through the semi-cylindrical lens 61 positioned at the center of the horizontal-oscillation range, only a beam component $B_C$, which is originally aligned with the optical axis of the camera 43, passes through the corresponding slit 62A of the slit plate 62 to reach the camera 43.

Thus, the camera 43 only receives the beam component $B_C$, originally aligned with the optical axis of the camera 43, of all the beam components of the light beam from the object. Here, referring to FIG. 14, a direction from which the object is viewed from the side adjacent to the camera 43 is defined as the forward direction. In this case, as shown in FIG. 16A, when the semi-cylindrical lenses 61 are positioned at the center of the horizontal-oscillation range, the camera 43 captures the image of the object as seen from the forward direction (the image corresponding to the light beam entering from the right with respect to the optical axis of a camera 93).

Furthermore, if the semi-cylindrical lenses 61 are, for example, shifted towards the left from the state shown in FIG. 16A, as shown in FIG. 16B, the beam components of the light beam from the object incident on each semi-cylindrical lens 61 are aligned with the optical axis of the camera 43, and are then transmitted through the corresponding semi-cylindrical lens 61 to enter the slit plate 62. Of all the beam components transmitted through the semi-cylindrical lens 61 positioned to the left of the horizontal-oscillation range, only a beam component BR, which is originally slanted towards the right with respect to the optical axis of the camera 43, passes through the corresponding slit 62A of the slit plate 62 to reach the camera 43.

Thus, the camera 43 only receives the beam component BR, originally slanted towards the right with respect to the optical axis of the camera 43, of all the beam components of the light beam from the object. Consequently, when the semi-cylindrical lenses 61 are positioned to the left of the horizontal-oscillation range as shown in FIG. 16B, the camera 43 captures the image of the object as seen from a position shifted to the left of the forward direction (the image corresponding to the light beam entering from the right with respect to the optical axis of the camera 43).

Furthermore, if the semi-cylindrical lenses 61 are, for example, shifted towards the right from the state shown in FIG. 16A, as shown in FIG. 16C, the beam components of the light beam from the object incident on each semi-cylindrical lens 61 are aligned with the optical axis of the camera 43, and are then transmitted through the corresponding semi-cylindrical lens 61 to enter the slit plate 62. Of all the beam components transmitted through the semi-cylindrical lens 61 positioned to the right of the horizontal-oscillation range, only a beam component $B_L$, which is originally slanted towards the left with respect to the optical axis of the camera 43, passes through the corresponding slit 62A of the slit plate 62 to reach the camera 43.

Thus, the camera 43 only receives the beam component $B_L$, originally slanted towards the left with respect to the optical axis of the camera 43, of all the beam components of the light beam from the object. Consequently, when the semi-cylindrical lenses 61 are positioned to the right of the horizontal-oscillation range as shown in FIG. 16C, the camera 43 captures the image of the object as seen from a position shifted to the right of the forward direction (the image corresponding to the light beam entering from the left with respect to the optical axis of the camera 43).

According to the image-capturing apparatus 11 shown in FIG. 14, the direction of beam components from the object subject to be received by the camera 43 varies depending on the position of the semi-cylindrical lenses 61. For this reason, by oscillating the lens plate 60 in the horizontal direction at a constant period, the camera 43 is capable of capturing images of the object as seen from multiple viewing angles in the horizontal direction while sacrificing the time resolution. Accordingly, full-parallax images having high spatial resolution can be captured in real time while allowing selectable viewpoints of the images to be viewed in the horizontal direction.

The lens plates 60 and 70 are oscillated such that, for example, at least the interval between adjacent semi-cylindrical lenses 61 (71) (i.e. the width of each semi-cylindrical lens 61 (71)) is set as the oscillation range.

Furthermore, in the second embodiment in FIG. 14, as mentioned above, the lens plate 70 in the display apparatus 12 has the same structure as the lens plate 60 in the image-capturing apparatus 11. Moreover, the semi-cylindrical lenses 71 of the lens plate 70 are oscillated in phase with the semi-cylindrical lenses 61 of the lens plate 60 at the same period.

On the other hand, the projector 53 emits a light beam corresponding to the image of the object captured by the camera 43, as described previously with reference to FIGS. 16A to 16C, as seen from each angle. The light beam is emitted in a direction parallel to the optical axis of the projector 53. The light beam emitted from the projector 53 passes through the slits in the slit plate 72 and is transmitted through the lens plate 70 so as to be received by the screen panel 54 held by the user.

Since the semi-cylindrical lenses 71 of the lens plate 70 are oscillated in phase with the semi-cylindrical lenses 61 of the lens plate 60 at the same period, the light beam emitted from the projector 53 is transmitted through the slit plate 72 and the semi-cylindrical lenses 71 in a manner such that the light beam traces back the optical path of the light beam shown in FIGS. 16A to 16C.

Accordingly, in FIG. 14, in a case where a user is in a position aligned with the optical axis of the projector 53 and holds up the screen panel 54 towards the projector 53, if the semi-cylindrical lenses 71 are in the state shown in FIG. 16A, the beam component of the light beam emitted from the projector 53 that is successfully transmitted through the slit plate 72 and the corresponding semi-cylindrical lenses 71 can trace back the optical path of the light beam shown in FIG. 16A so as to be received by the screen panel 54. Accordingly, when the semi-cylindrical lenses 61 are in the state shown in FIG. 16A, the screen panel 54 displays the image of the object captured by the camera 43, that is, the image of the object as seen from the forward direction.

Furthermore, in a case where the user moves towards the left with respect to the optical axis of the projector 53 and holds up the screen panel 54 towards the projector 53, if the semi-cylindrical lenses 71 are in the state shown in FIG. 16B, the beam component of the light beam emitted from the projector 53 that is successfully transmitted through the slit plate 72 and the corresponding semi-cylindrical lens 71 can trace back the optical path of the light beam shown in FIG. 16B so as to be received by the screen panel 54. Accordingly, when the semi-cylindrical lenses 61 are in the state shown in FIG. 16B, the screen panel 54 displays the image of the object captured by the camera 43, that is, the image of the object as seen from a position shifted towards the left with respect to the forward direction.

Furthermore, in a case where the user moves towards the right with respect to the optical axis of the projector 53 and holds up the screen panel 54 towards the projector 53, if the semi-cylindrical lenses 71 are in the state shown in FIG. 16C, the beam component of the light beam emitted from the projector 53 that is successfully transmitted through the slit plate 72 and the corresponding semi-cylindrical lens 71 can trace back the optical path of the light beam shown in FIG. 16C so as to be received by the screen panel 54. Accordingly, when the semi-cylindrical lenses 61 are in the state shown in FIG. 16C, the screen panel 54 displays the image of the object captured by the camera 43, that is, the image of the object as seen from a position shifted towards the right with respect to the forward direction.

Accordingly, the user is able to view the image of an object from each angle as if the user is seeing the actual object from that particular angle. Like the image-capturing apparatus 11, since the lens plate 70 is oscillated at a constant period in the horizontal direction, the display apparatus 12 in FIG. 14 is capable of displaying images of an object as seen from multiple viewing angles in the horizontal direction while sacrificing the time resolution. Consequently, full-parallax images having high spatial resolution can be viewed by the user in real time while allowing selectable viewpoints of the images to be viewed by the user in the horizontal direction.

In FIGS. 16A to 16C, the surface of the lens plate 60, acting as the lenticular-lens assembly, not having protrusions disposed thereon (i.e. the surface not having the protruding side of the semi-cylindrical lenses 61) faces the slit plate 62.

Figure 17A:
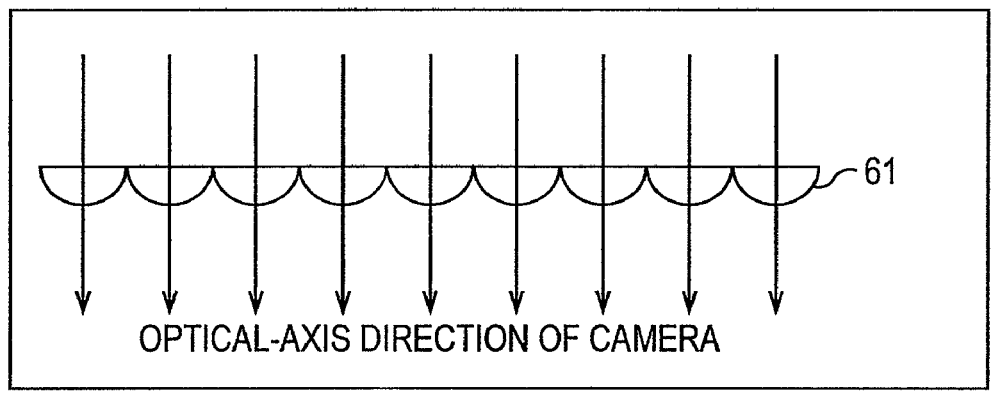
FIG. 17A illustrates beam components of a light beam being transmitted through the lens plate 60.
Figure 17B:
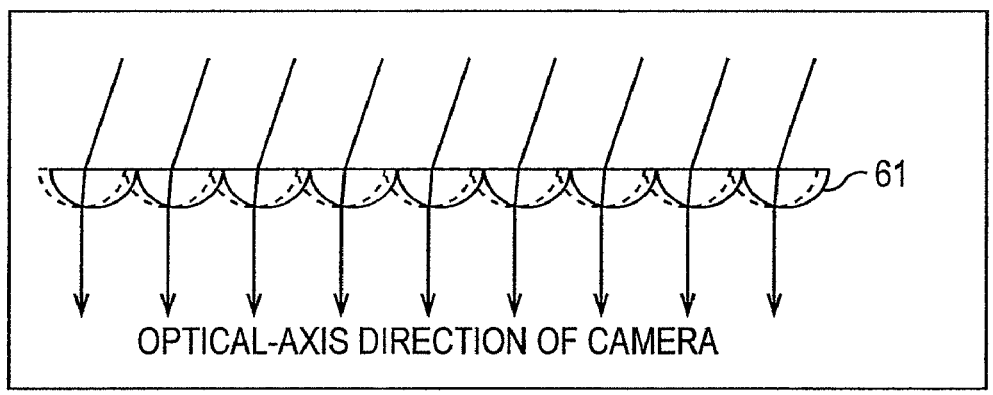
FIG. 17B illustrates beam components of a light beam being transmitted through the lens plate 60.
Figure 17C:
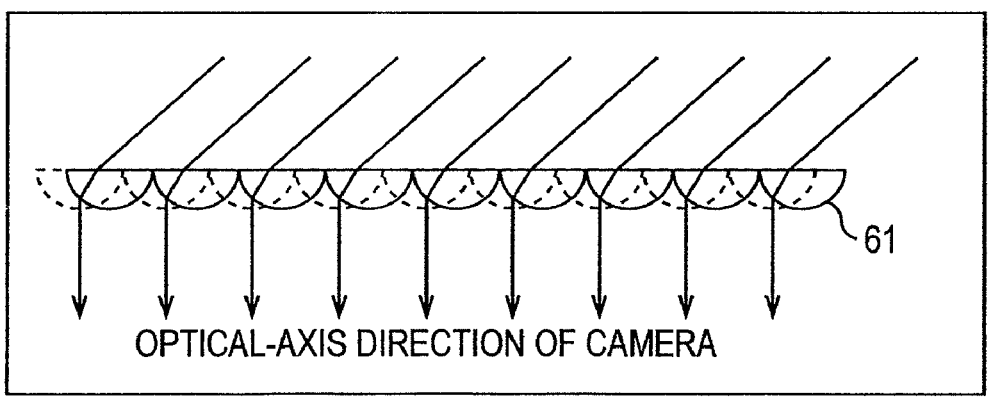
FIG. 17C illustrates beam components of a light beam being transmitted through the lens plate 60.

Alternatively, the lens plate 60 may be disposed in a manner such that the surface having the protrusions faces the slit plate 62. In such a case, as shown in FIGS. 17A to 17C, by oscillating the lens plate 60, in the horizontal direction, the light beam from the object can be received by the camera 43 while being aligned with the optical axis of the camera 43. The same applies to the lens plate 70. The slit plate 62 is not shown in FIGS. 17A to 17C.

Furthermore, although the slit plate 62 is disposed between the lens plate 60 and the camera 43 in the second embodiment in FIG. 14, the slit plate 62 may alternatively be disposed between the object and the lens plate 60. Similarly, the slit plate 72 may alternatively be disposed to the right of the lens plate 70 instead of being disposed between the projector 53 and the lens plate 70.

Figure 18:
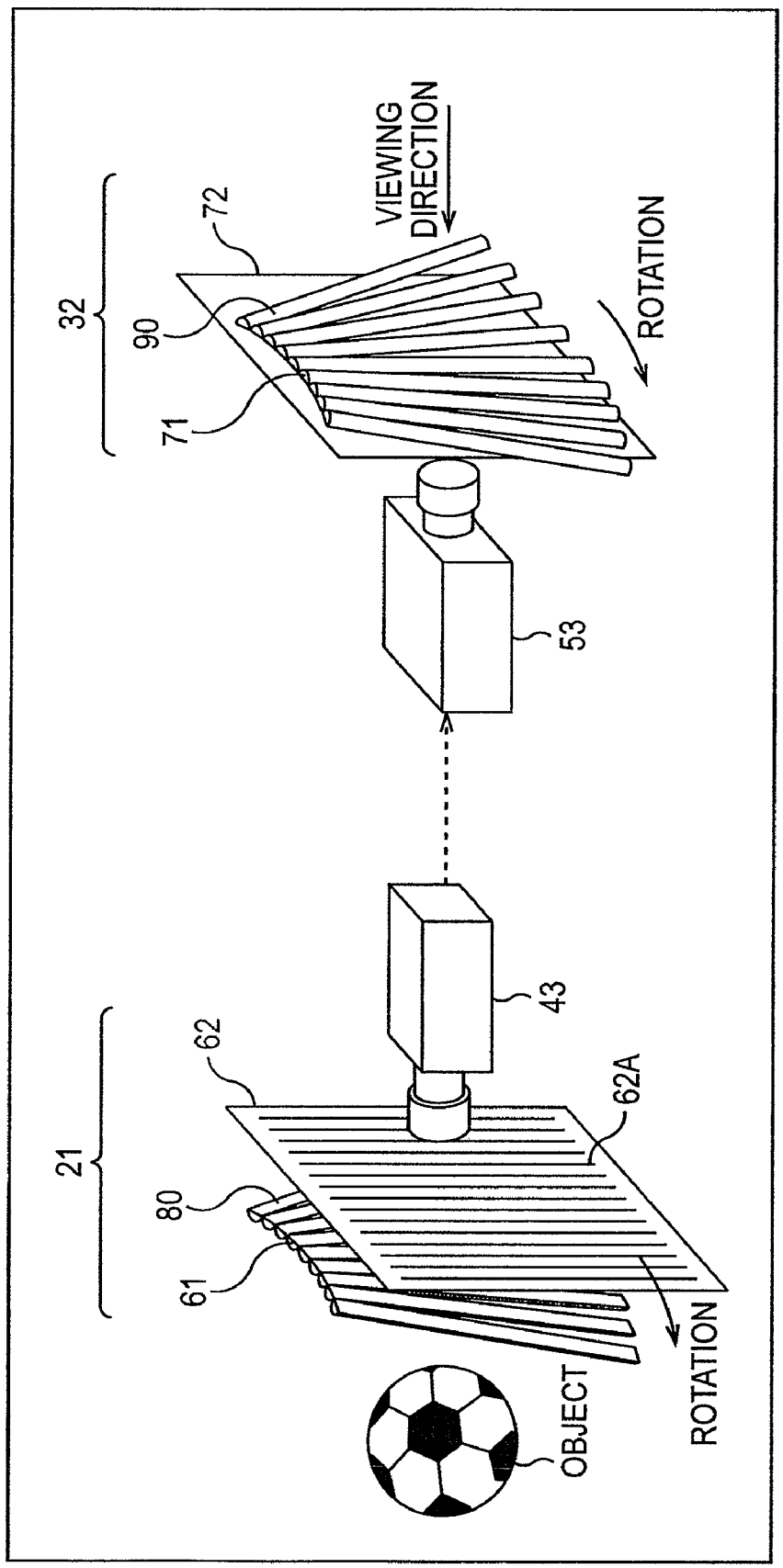
FIG. 18 is a perspective view of the image-capturing optical unit 21 and the display optical unit 32 according to a third embodiment.

FIG. 18 is a perspective view of the image-capturing optical unit 21 and the display optical unit 32 according to a third embodiment. Here, the components corresponding to those in FIG. 14 are given the same reference numerals, and descriptions of such components are omitted. In FIG. 18, the image-capturing optical unit 21 is provided with a disc lens plate 80 in place of the lens plate 60, and moreover, the display optical unit 32 is provided with a disc lens plate 90 in place of the lens plate 70. Other than these components, the structure is basically the same as that shown in FIG. 14.

Figure 19:
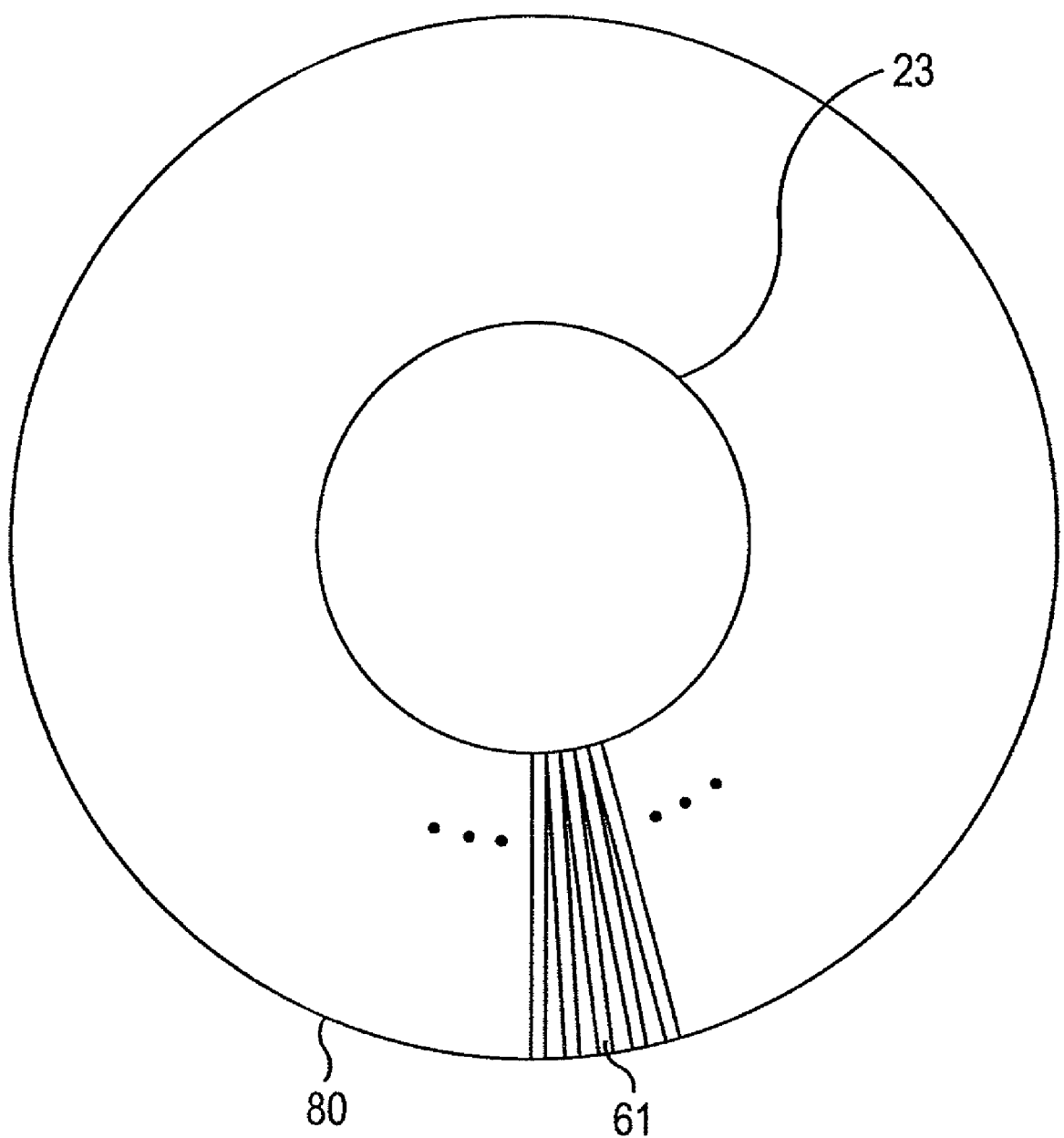
FIG. 19 is a plan view of a disc lens plate 80.

FIG. 19 illustrates an example of the structure of the disc lens plate 80 shown in FIG. 18.

Similar to the lens plate 60 in FIG. 14, the disc lens plate 80 is a lenticular-lens assembly including the arrayed semi-cylindrical lenses 61. However, the disc lens plate 80 is a disc-shaped lenticular-lens assembly in which the semi-cylindrical lenses 61 are arrayed in a manner such that each semi-cylindrical lens 61 extends longitudinally along the radius of the disc.

In this case, the driver 23 is disposed at the center of the disc lens plate 80 acting as the disc-shaped lenticular-lens assembly, and drives the disc lens plate 80 at a constant angular rate.

The radius of the disc lens plate 80 is sufficiently larger than the width of the arrayed semi-cylindrical lenses 61 of the disc lens plate 80 (that is, the length of each of the semi-cylindrical lenses 61 arranged along the circumference of the disc lens plate 80 in FIG. 19). Accordingly, like the lens plate 60 shown in FIGS. 15A and 15B, a section of the disc lens plate 80 including some of the semi-cylindrical lenses 61 faces the slit plate 62, and each of the semi-cylindrical lenses 61 in that section extends longitudinally in the vertical direction. Moreover, the semi-cylindrical lenses 61 in that section are arrayed parallel to one another in the same plane.

The disc lens plate 80 having the structure described above is rotated at a constant angular rate so that, similar to the semi-cylindrical lenses 61 of the lens plate 60 in FIG. 14, the position of the semi-cylindrical lenses 61 in the section of the disc lens plate 80 facing the slit plate 62 changes periodically. Like the image-capturing apparatus 11 in FIG. 14, since the position of the semi-cylindrical lenses 61 changes periodically according to the image-capturing apparatus 11 in FIG. 18, the direction of a light beam from an object entering the camera 43 also changes in a periodical manner. Thus, the camera 43 is capable of capturing images of an object as seen from multiple viewing angles in the horizontal direction while sacrificing the time resolution. Accordingly, full-parallax images having high spatial resolution can be captured in real time while allowing selectable viewpoints of the images to be viewed in the horizontal direction.

Referring to FIG. 18, the disc lens plate 90 in the display apparatus 12 has the same structure as the disc lens plate 80 in the image-capturing apparatus 11. Based on the control operation by the controller 34, the driver 33 (FIG. 3) rotates the disc lens plate 90 in phase with the disc lens plate 80 at the same angular rate.

The number of semi-cylindrical lenses 71 provided in the disc lens plate 90 is the same as the number of the semi-cylindrical lenses 61 provided in the disc lens plate 80. However, the expression "in phase with" cited above does not necessarily mean that, for example, when viewed from the side adjacent to the object, the position of one of the semi-cylindrical lenses 61 in the disc lens plate 80 has to be aligned with the position of one of the semi-cylindrical lenses 71 in the disc lens plate 90 that corresponds to that semi-cylindrical lens 61. In other words, the expression "in phase with" cited above implies that, for example, when viewed from the side adjacent to the object, the position of one of the semi-cylindrical lenses 61 in the disc lens plate 80 may be aligned with a position of any of the semi-cylindrical lenses 71 in the disc lens plate 90.

Furthermore, the phase between the disc lens plate 80 in the image-capturing apparatus 11 and the disc lens plate 90 in the display apparatus 12, for example, is considered to be equivalent to the positional relationship between the semi-cylindrical lenses 61 and the semi-cylindrical lenses 71 of the respective disc lens plate 80 and disc lens plate 90 as viewed from the side adjacent to the object.

Accordingly, by rotating the disc lens plate 90 in phase with the disc lens plate 80 at the same angular rate, the position of the semi-cylindrical lenses 71 in the disc lens plate 90 facing the slit plate 72 changes periodically in the same manner as the semi-cylindrical lenses 71 of the lens plate 70 shown in FIG. 14. Consequently, similar to the display apparatus 12 shown in FIG. 14, the position of the semi-cylindrical lenses 71 in the display apparatus 12 in FIG. 18 changes periodically, meaning that beam components of a light beam emitted from the projector 53 transmit through the semi-cylindrical lenses 71 and are distributed in directions corresponding to the directions of the beam components from the object received by the camera 43. Accordingly, the display apparatus 12 of FIG. 18 is capable of displaying images of an object as seen from multiple viewing angles in the horizontal direction while sacrificing the time resolution. In other words, a user may hold up the screen panel 54 (FIG. 7) at a side of the disc lens plate 90 opposite to the side where the slit plate 72 is disposed such that an image of the object as viewed from that particular position is displayed on the screen panel 54. As a result, full-parallax images having high spatial resolution can be viewed by the user in real time while allowing selectable viewpoints of the images to be viewed by the user in the horizontal direction.

In comparison with the second embodiment in FIG. 14 in which the lens plates 60 and 70 are oscillated in the horizontal direction, the disc lens plates 80 and 90 in the third embodiment in FIG. 18 are rotated in a predetermined direction. In the second embodiment in FIG. 14, a significantly large load is required when the direction of oscillation for the lens plates 60 and 70 is switched from left to right, or from right to left. In contrast, according to the third embodiment in FIG. 18, since it is not necessary to switch the rotational direction of the disc lens plates 80 and 90, the disc lens plates 80 and 90 can be driven stably at high speed.

Figure 20:
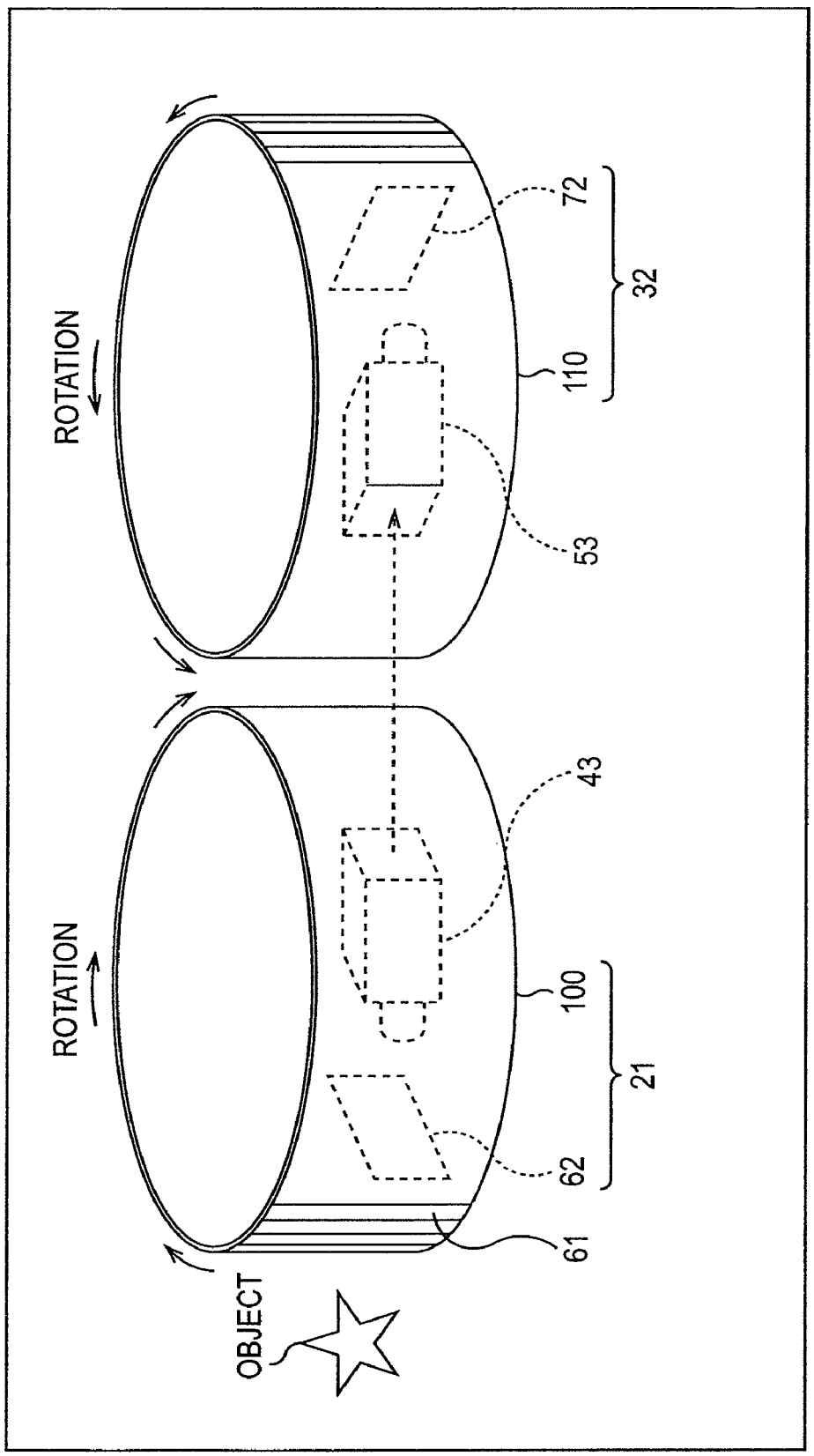
FIG. 20 is a perspective view of the image-capturing optical unit 21 and the display optical unit 32 according to a fourth embodiment.

FIG. 20 is a perspective view of the image-capturing optical unit 21 and the display optical unit 32 according to a fourth embodiment. Here, the components corresponding to those in FIG. 14 are given the same reference numerals, and descriptions of such components are omitted. In FIG. 18, the image-capturing optical unit 21 is provided with a lens drum 100 in place of the lens plate 60, and moreover, the display optical unit 32 is provided with a lens drum 110 in place of the lens plate 70. Other than these components, the structure is basically the same as that shown in FIG. 14.

Similar to the lens plate 60 shown in FIG. 14, the lens drum 100 is a lenticular-lens assembly including the arrayed semi-cylindrical lenses 61. However, the lens drum 100 is a cylindrical lenticular-lens assembly in which the semi-cylindrical lenses 61 are arrayed to form a cylinder in a manner such that each semi-cylindrical lens 61 extends longitudinally in the vertical direction. In other words, the arrayed semi-cylindrical lenses 61 in the lenticular-lens assembly define the periphery of the cylinder of the lens drum 100.

In the fourth embodiment in FIG. 20, the slit plate 62 and the camera 43 are disposed inside the cylindrical lens drum 100. On the other hand, an object is disposed outside the cylindrical lens drum 100, meaning that a light beam from the object outside the lens drum 100 is transmitted through the semi-cylindrical lenses 61 of the lens drum 100 and the slits 62A in the slit plate 62 so as to be received by the camera 43.

Furthermore, the radius of each end surface of the lens drum 100 is large enough such that, similar to the lens plate 60 in FIGS. 15A and 15B, a section of the lens drum 100 including some of the semi-cylindrical lenses 61 faces the slit plate 62, and each of the semi-cylindrical lenses 61 in that section extends longitudinally in the vertical direction. Moreover, the semi-cylindrical lenses 61 in that section are arrayed parallel to one another in the same plane.

In the fourth embodiment in FIG. 20, the driver 23 (FIG. 3) rotates the lens drum 100 at a constant angular rate around a rotary axis extending between the central points of the two end surfaces.

In this case, according to the lens drum 100, the position of some of the semi-cylindrical lenses 61 facing the slit plate 62 changes periodically in the same manner as the semi-cylindrical lenses 61 of the lens plate 60 in FIG. 14. Consequently, similar to the image-capturing apparatus 11 in FIG. 14, the position of the semi-cylindrical lenses 61 in the image-capturing apparatus 11 in FIG. 20 changes periodically, meaning that the direction of a light beam incident on the camera 43 also changes periodically. Thus, the camera 43 is capable of capturing images of an object as seen from multiple viewing angles in the horizontal direction while sacrificing the time resolution. As a result, full-parallax images having high spatial resolution can be captured in real time while allowing selectable viewpoints of the images to be viewed in the horizontal direction.

On the other hand, the lens drum 110 included in the display apparatus 12 has the same structure as the lens drum 100 in the image-capturing apparatus 11. Based on the control operation by the controller 34, the driver 33 (FIG. 3) rotates the lens drum 110 in phase with the lens drum 100 at the same angular rate.

The number of semi-cylindrical lenses 71 provided in the lens drum 110 is the same as the number of the semi-cylindrical lenses 61 provided in the lens drum 100. The expression "in phase with" cited above does not necessarily mean that, for example, when viewed from the side adjacent to the object, the position of one of the semi-cylindrical lenses 61 in the lens drum 100 has to be aligned with the position of one of the semi-cylindrical lenses 71 in the lens drum 110 that corresponds to that semi-cylindrical lens 61. In other words, the expression "in phase with" cited above implies that, for example, when viewed from the side adjacent to the object, the position of one of the semi-cylindrical lenses 61 in the lens drum 100 may be aligned with a position of any of the semi-cylindrical lenses 71 in the lens drum 110.

Furthermore, the phase between the lens drum 100 in the image-capturing apparatus 11 and the lens drum 110 in the display apparatus 12, for example, is considered to be equivalent to the positional relationship between the semi-cylindrical lenses 61 and the semi-cylindrical lenses 71 of the respective lens drum 100 and lens drum 110 as viewed from the side adjacent to the object.

Accordingly, by rotating the lens drum 110 in phase with the lens drum 100 at the same angular rate, the position of the semi-cylindrical lenses 71 in the lens drum 110 facing the slit plate 72 changes periodically in the same manner as the semi-cylindrical lenses 71 of the lens plate 70 in FIG. 14. Consequently, similar to the display apparatus 12 in FIG. 14, the position of the semi-cylindrical lenses 71 in the display apparatus 12 in FIG. 20 changes periodically, meaning that beam components of a light beam emitted from the projector 53 transmit through the semi-cylindrical lenses 71 and are distributed in directions corresponding to the directions of the beam components from the object received by the camera 43. Accordingly, the display apparatus 12 of FIG. 20 is capable of displaying images of an object as seen from multiple viewing angles in the horizontal direction while sacrificing the time resolution. In other words, a user may hold up the screen panel 54 (FIG. 7) outside the lens drum 110 (within a range in which the light beam emitted from the projector 53 can successfully transmit through the slit plate 72 and the lens drum 110), such that an image of the object as viewed from that side is displayed on the screen panel 54. As a result, full-parallax images having high spatial resolution can be viewed by the user in real time while allowing selectable viewpoints of the images to be viewed by the user in the horizontal direction.

Similar to the third embodiment in FIG. 18, the lens drums 100 and 110 in the fourth embodiment in FIG. 20 are rotated in a predetermined direction, and moreover, since it is not necessary to switch the rotational direction of the lens drums 100 and 110, the lens drums 100 and 110 can be driven stably at high speed.

Figure 21:
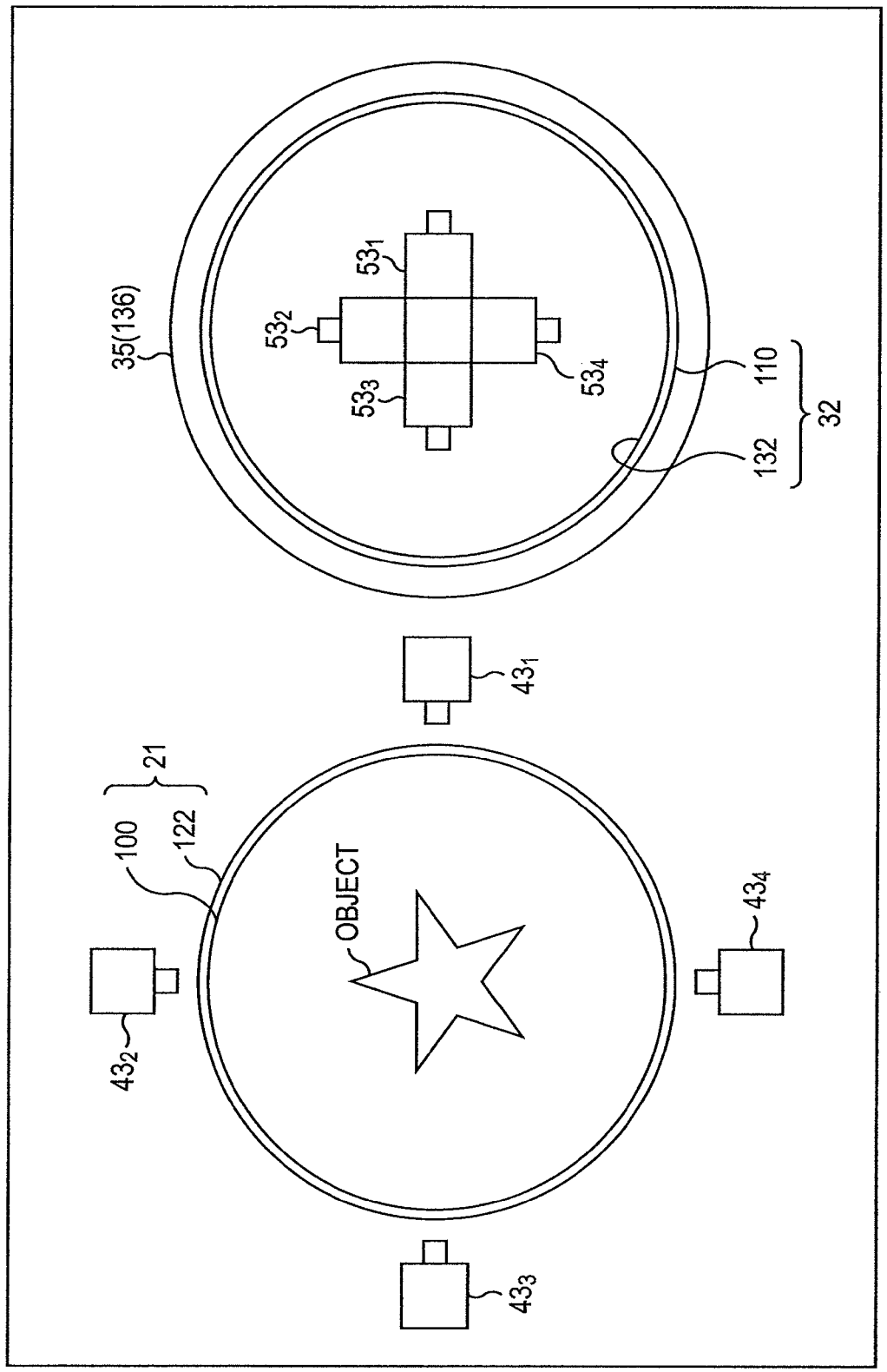
FIG. 21 is a top view of the image-capturing optical unit 21 and the display optical unit 32 according to a fifth embodiment.

FIG. 21 is a top view of the image-capturing optical unit 21 and the display optical unit 32 according to a fifth embodiment. Here, the components corresponding to those in FIG. 20 are given the same reference numerals, and descriptions of such components are omitted.

According to the fifth embodiment in FIG. 21, the slit plate 62 illustrated in FIG. 20 is not provided in the image-capturing optical unit 21. As an alternative to the slit plate 62, a slit plate 122 is provided.

The slit plate 122 is cylindrical, and is provided with a plurality of slits on its periphery. The slits extend in parallel to a line extending between the central points of two end surfaces of the cylindrical slit plate 122. Moreover, the radius of each end surface of the cylindrical slit plate 122 is slightly larger than that of the cylindrical lens drum 100, and the slit plate 122 is disposed around the lens drum 100 such that the lens drum 100 is surrounded by the slit plate 122. Alternatively, it is also possible for the radius of each end surface of the cylindrical slit plate 122 to be slightly smaller than that of the cylindrical lens drum 100, such that the slit plate 122 is disposed on the inner side of the lens drum 100.

An object is disposed inside the lens drum 100 and the slit plate 122. Furthermore, the fifth embodiment in FIG. 21 is provided with, for example, four cameras $43_1$ to $43_4$ which act as the image-capturing unit 22 (FIG. 3). The cameras $43_1$ to $43_4$, for example, each have the same structure as the camera 43 shown in FIG. 20.

The four cameras $43_1$ to $43_4$ are disposed outside the lens drum 100 and the slit plate 122 while surrounding and facing the object. In the fifth embodiment in FIG. 21, the four cameras $43_1$ to $43_4$ are, for example, disposed at a regular interval (in an equiangular manner), namely, at 90° from one another. Moreover, the optical axes of the four cameras $43_1$ to $43_4$ are disposed in the same plane while intersecting at a specific point in that plane. However, the number of cameras acting as the image-capturing unit 22 is not limited to four, and moreover, the multiple cameras acting as the image-capturing unit 22 do not necessarily have to be positioned in the above-mentioned manner in which the cameras surround the object.

In the display optical unit 32 in FIG. 21, the slit plate 72 shown in FIG. 20 is not provided. As an alternative to the slit plate 72, a slit plate 132 is provided.

Like the slit plate 122 in the image-capturing optical unit 21, the slit plate 132 is cylindrical. Moreover, similar to the slit plate 122, the periphery of the slit plate 132 is provided with a plurality of slits. However, the radius of each end surface of the cylindrical slit plate 132 is slightly smaller than that of the cylindrical lens drum 110, and the slit plate 132 is disposed on the inner side of the lens drum 110 such that the slit plate 132 is surrounded by the lens drum 110. Alternatively, it is also possible for the radius of each end surface of the cylindrical slit plate 132 to be slightly larger than that of the cylindrical lens drum 110, such that the slit plate 132 is disposed around the outer side of the lens drum 110.

The fifth embodiment in FIG. 21 is provided with four projectors $53_1$ to $53_4$ acting as the display unit 31 (FIG. 3), that is, the same number of the cameras $43_1$ to $43_4$ provided as the image-capturing unit 22. The projectors $53_1$ to $53_4$ each have the same structure as the projector 53 in FIG. 20.

Each of the projectors $53_i$ (i=1, 2, 3, or 4), for example, emits a light beam corresponding to an image of the object captured by the corresponding camera $43_i$. Moreover, the four projectors $53_1$ to $53_4$ are disposed in a manner such that the positional relationship among the optical axes of the projectors $53_1$ to $53_4$ and the positional relationship among the optical axes of the cameras $43_1$ to $43_4$ are equivalent.

Accordingly, in the fifth embodiment in FIG. 21, the four projectors $53_1$ to $53_4$ are disposed in the same manner as the four cameras $43_1$ to $43_4$, in which the optical axes of the four projectors $53_1$ to $53_4$ are in the same plane while intersecting at a specific point in that plane. Moreover, in the fifth embodiment in FIG. 21, the optical axis of the camera $43_2$ is equivalent to the optical axis of the camera $43_1$ rotated counterclockwise by 90°, the optical axis of the camera $43_3$ is equivalent to the optical axis of the camera $43_2$ rotated counterclockwise by 90°, and the optical axis of the camera $43_4$ is equivalent to the optical axis of the camera $43_3$ rotated counterclockwise by 90°. Accordingly, with respect to the optical axes of the projectors $53_1$ to $53_4$, the optical axis of the projector $53_2$ is equivalent to the optical axis of the projector $53_1$ rotated counterclockwise by 90°, the optical axis of the projector $53_3$ is equivalent to the optical axis of the projector $53_2$ rotated counterclockwise by 90°, and the optical axis of the projector $53_4$ is equivalent to the optical axis of the projector $53_3$ rotated counterclockwise by 90°.

In contrast to the cameras $43_1$ to $43_4$ which are disposed outside the lens drum 100 and the slit plate 122 while facing the object, that is, towards a specific point on the central line extending between the central points of the two end surfaces of the lens drum 100 (or the slit plate 122), the projectors $53_1$ to $53_4$ are disposed inside the lens drum 110 and the slit plate 132 and on a specific point on the central line extending between the central points of the two end surfaces of the lens drum 110 (or the slit plate 132) while facing towards the exterior from that point.

Assuming that the image-capturing optical unit 21 and the display optical unit 32 are not present, each of the cameras $43_i$ captures an image of the object by receiving the light beam from the object reaching the position of the corresponding camera $43_i$. The corresponding projector $53_i$ then emits a light beam corresponding to the image of the object captured by the camera $43_i$. Accordingly, this means that the light beam emitted from the projector $53_i$ is equivalent to the light beam from the object reaching the position of the camera $43_i$. In other words, if the light beam emitted from one of the projectors $53_i$ is received by, for example, ground glass functioning as a light-diffusing member, when a side of the ground glass opposite to the side receiving the light beam from the projector $53_i$ is viewed, the same image of the object as what can be seen from the position of the camera $43_i$ may be viewed.

In the fifth embodiment in FIG. 21, a cylindrical screen panel 136 is provided as the diffuser 35 (FIG. 3).

The cylindrical screen panel 136 includes, for example, cylindrical ground glass functioning as a light-diffusing member; and an optical-filter film, equivalent to the optical-filter film 56A illustrated in FIGS. 9 to 11, attached to the inner side surface of the cylindrical ground glass. In the cylindrical screen panel 136, the slits (FIG. 10) in the optical-filter film extend in parallel to the vertical direction (i.e. in the height direction of the cylindrical screen panel 136). The radius of each end surface of the cylindrical screen panel 136 is larger than that of the cylindrical lens drum 110, and the cylindrical screen panel 136 is disposed around the lens drum 110 such that the lens drum 110 is surrounded by the cylindrical screen panel 136. Consequently, of all light beams emitted from the projectors $53_1$ to $53_4$, only the light beam components that pass through the slit plate 132 and the lens drum 110 and that travel perpendicular with respect to the inner side surface of the cylindrical screen panel 136 can be transmitted through the optical filter film disposed on the inner side surface in order to be received by the ground glass of the cylindrical screen panel 136.

As illustrated in FIG. 20, the lens drums 100 and 110 rotate in phase with each other at the same angular rate, whereas the slit plates 122 and 132 are fixed.

According to the image-capturing optical unit 21 and the display optical unit 32 having the above structure, of all light beam components from the object, the beam components transmitted through the lens drum 100 and the slit plate 122 are received by the cameras $43_1$ to $43_4$ where the images of the object corresponding to the beam components are captured.

On the other hand, the projectors $53_1$ to $53_4$ emit light beams corresponding to the images captured by the respective cameras $43_1$ to $43_4$. Of all light beams emitted from the projectors $53_1$ to $53_4$, the light beam components transmitted through the slit plate 132 and the lens drum 110 are received by the cylindrical screen panel 136. The cylindrical screen panel 136 displays the images corresponding to the received beam components.

In the fifth embodiment in FIG. 21, if the object is viewed from one of the cameras $43_i$, the slit plate 122 and the lens drum 100 are present in the space between the camera $43_i$ and the object.

On the other hand, in the fourth embodiment in FIG. 20, if the object is viewed from the camera 43, the slit plate 62 and the lens drum 100 are present in the space between the camera 43 and the object.

This means that, similar to the camera 43 shown in FIG. 20, the cameras $43_1$ to $43_4$ in FIG. 21 are capable of capturing images of an object as seen from multiple viewing angles in the horizontal direction while sacrificing the time resolution.

Accordingly, full-parallax images having high spatial resolution can be captured in real time while allowing selectable viewpoints of the images to be viewed in the horizontal direction.

Furthermore, according to the fifth embodiment in FIG. 21, if the cylindrical screen panel 136 is viewed from one of the projectors $53_i$, the slit plate 132 and the lens drum 110 are present in the space between the projector $53_i$ and the cylindrical screen panel 136.

On the other hand, in the fourth embodiment in FIG. 20, if the screen panel 54 (FIG. 7) held by a user (facing the outer side of the lens drum 110) is viewed from the projector 53, the slit plate 72 and the lens drum 110 are present in the space between the projector 53 and the screen panel 54.

Accordingly, similar to the display apparatus 12 shown in FIG. 20, the display apparatus 12 shown in FIG. 21 is capable of displaying images of an object as seen from multiple viewing angles in the horizontal direction while sacrificing the time resolution. In detail, when a user views the cylindrical screen panel 136 from a position outside of the cylindrical screen panel 136, the user may see the image of an object on the cylindrical screen panel 136 as if the user is seeing the actual object from that position. Consequently, full-parallax images having high spatial resolution can be viewed by the user in real time while allowing selectable viewpoints of the images to be viewed by the user in the horizontal direction.

In the fourth embodiment in FIG. 20, a single camera 43 receives the light beam from the object via the lens drum 100 and the slit plate 62. Thus, the image of the object captured by the camera 43 is limited within a predetermined area of the object facing the camera 43. In other words, for example, the camera 43 cannot capture an image of the far side of the object. For this reason, according to the fourth embodiment in FIG. 20, the image of the object displayed by the display apparatus 12 is similarly limited to the predetermined area of the object that can be captured by the camera 43. In other words, for example, referring to FIG. 20, if a user holds up the screen panel 54 at a side of the projector 53 opposite to the side where the slit plate 72 is disposed, the image of the object is not displayed on the screen panel 54.

In contrast, according to the fifth embodiment in FIG. 21, the image-capturing apparatus 11 is capable of capturing images of an object with a 360° field of view, meaning that the display apparatus 12 can similarly display images of the object with a 360° field of view.

Thus, according to the fifth embodiment in FIG. 21, the four cameras $43_1$ to $43_4$ allow images of an object to be captured with a 360° field of view. Furthermore, the four projectors $53_1$ to $53_4$ emit light beams corresponding to the images captured by the respective cameras $43_1$ to $43_4$. Accordingly, the cylindrical screen panel 136 is capable of displaying images of an object with a 360° field of view.

The fifth embodiment in FIG. 21 thus provides images having high spatial resolution in real time while allowing an extensive selectable viewing range of the images for a user in the horizontal direction.

Figure 22:
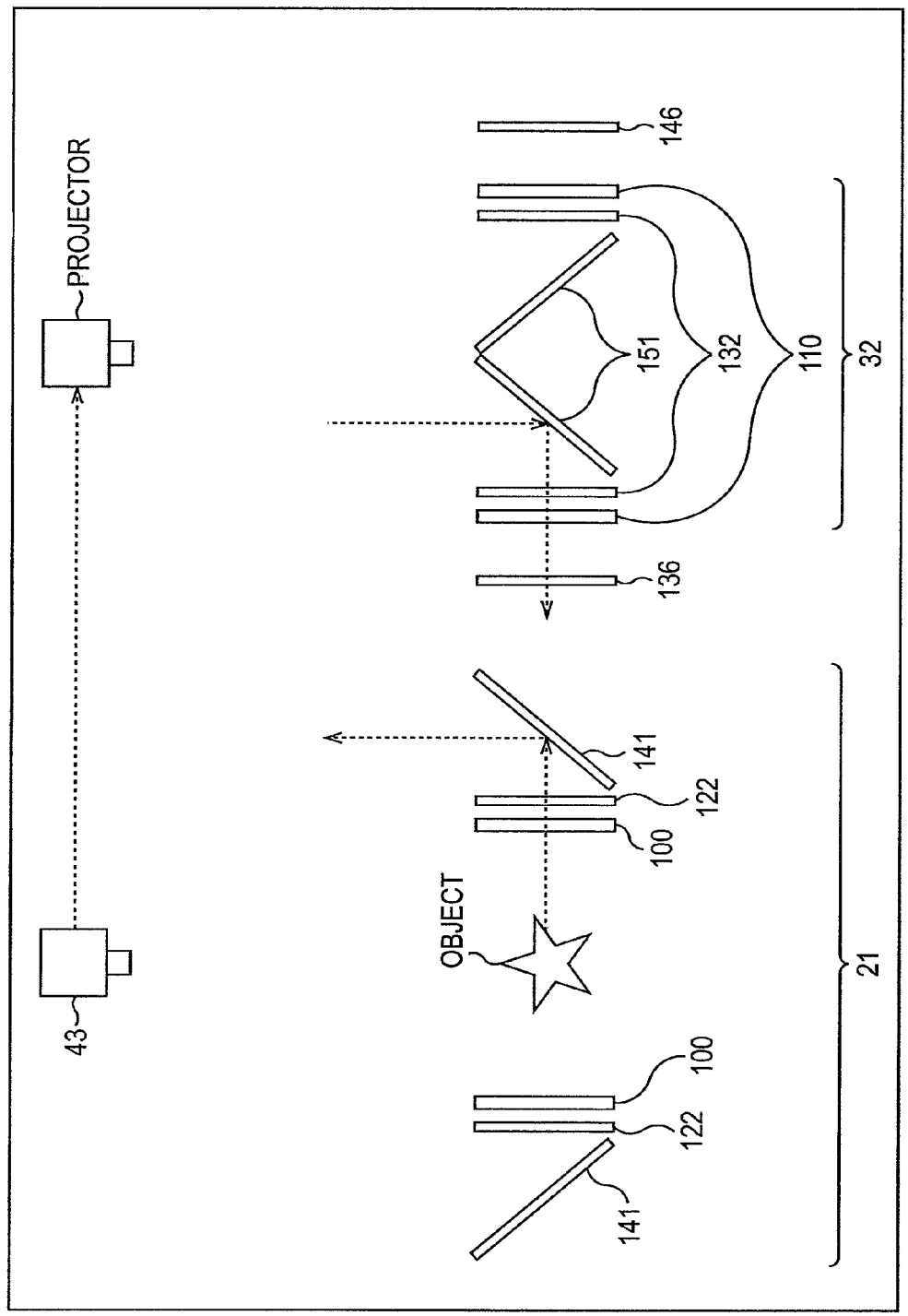
FIG. 22 is a cross-sectional view of the image-capturing optical unit 21 and the display optical unit 32 according to the fifth embodiment.

FIG. 22 is a cross-sectional view of the image-capturing optical unit 21 and the display optical unit 32 according to a sixth embodiment. Here, the components corresponding to those in FIG. 20 or 21 are given the same reference numerals, and descriptions of such components are omitted.

According to the sixth embodiment in FIG. 22, in addition to the lens drum 100 and the slit plate 122, the image-capturing optical unit 21 is further provided with a semi-conical mirror 141.

The semi-conical mirror 141 is a mirror having a semi-conical shape, namely, the shape of a lower portion of a cone if the cone were to be cut into two along a plane parallel to the base surface to form an upper portion and a lower portion. The semi-conical mirror 141 is fixed such that the semi-conical mirror 141 is disposed around the outer side of the slit plate 122 and surrounds the slit plate 122. Moreover, the inner side surface of the semi-conical mirror 141 defines a mirror, such that the mirror is disposed at, for example, a 45° angle with respect to the side surfaces of the cylindrical slit plate 122 and lens drum 100.

Accordingly, of all light beam components from an object, the light beam components transmitted through the lens drum 100 and the slit plate 122 enter the semi-conical mirror 141 where the light beam components are reflected upward.

In the sixth embodiment in FIG. 22, a single camera 43 functioning as the image-capturing unit 22 is disposed above the image-capturing optical unit 21. The camera 43 receives the light beam components from the object reflected by the semi-conical mirror 141.

Of all the light beam components emitted from the object in the 360° direction, since the light beam components transmitted through the lens drum 100 and the slit plate 122 are reflected upward by the semi-conical mirror 141, i.e. towards the camera 43, a single camera 43 can capture an image of the object with a 360° field of view.

The camera 43 in FIG. 22 captures an image of the object with a 360° field of view in a so-called donut-like manner.

On the other hand, in addition to the lens drum 110 and the slit plate 132, the display optical unit in FIG. 22 is further provided with a conical mirror 151.

The conical mirror 151 is a mirror having a conical shape, namely, the shape of an upper portion of a cone if the cone were to be cut into two along a plane parallel to the base surface to form an upper portion and a lower portion. The conical mirror 151 is fixed such that the conical mirror 151 is disposed inside the slit plate 132 and is surrounded by the slit plate 132. Moreover, the outer side surface of the conical mirror 151 defines a mirror, such that the mirror is disposed at, for example, a 45° angle with respect to the side surfaces of the cylindrical slit plate 132 and lens drum 110.

In the sixth embodiment in FIG. 22, a single projector 53 functioning as the display unit 31 is disposed above the display optical unit 32. The projector 53 emits a light beam corresponding to the image captured by the camera 43 toward the conical mirror 151.

The conical mirror 151 reflects the light beam emitted from the projector 53 towards the slit plate 132. Of all light beam components of the light beam reflected by the conical mirror 151, the light beam components transmitted through the slit plate 132 and the lens drum 110 are received by the cylindrical screen panel 136. Thus, the cylindrical screen panel 136 can display the image of the object with a 360° field of view.

Accordingly, the light beam components from the object transmitted through the lens drum 100 and the slit plate 122 are substantially equivalent to the light beam components received by the cylindrical screen panel 136 after being reflected by the conical mirror 151 and transmitted through the slit plate 132 and the lens drum 110. Consequently, the cylindrical screen panel 136 can display the image of the object with a 360° field of view.

According to the sixth embodiment in FIG. 22, an image of an object can be captured with a single camera 43 with a 360° field of view, and similarly, an image of an object can be displayed with a single projector 53 with a 360° field of view.

However, in the sixth embodiment in FIG. 22, since the image corresponding to a light beam reflected by the conical mirror 151 is upside-down with respect to the image corresponding to a light beam from the object, an additional optical unit, for example, for vertically inverting light beams is required between the conical mirror 151 and the cylindrical screen panel 136 in the display apparatus 12 so that the image can be displayed while maintaining the correct vertical posture of the image.

According to the first embodiment in FIG. 3, the controller 24 in the image-capturing apparatus 11 generates drive data for the driver 23 so that the image-capturing optical unit 21 can be driven at a predetermined timing, and based on the drive data, the controller 34 in the display apparatus 12 controls the driver 33 such that the display optical unit 32 operates in phase with the image-capturing optical unit 21 at the same period. Alternatively, it is possible to allow the display optical unit 32 to operate in phase with the image-capturing optical unit 21 at the same period without the drive data.

Figure 23A:
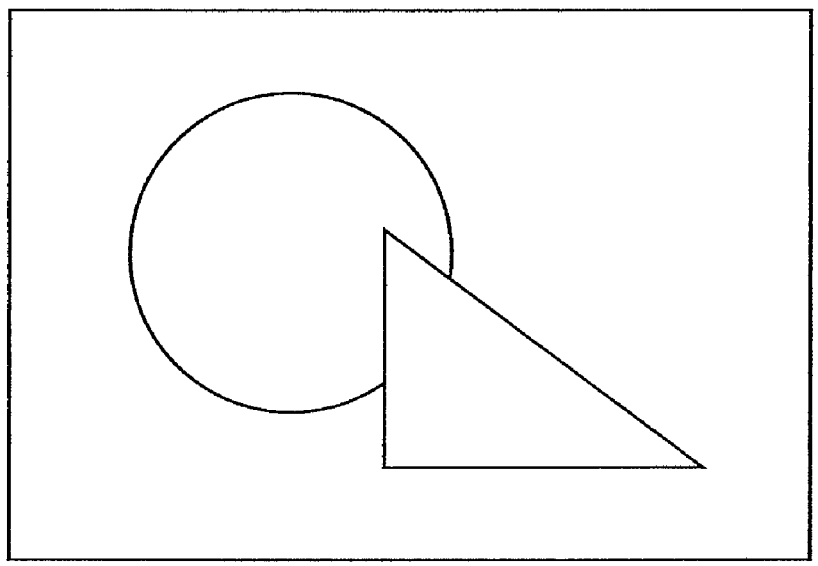
FIG. 23A illustrates a front image of an object and an angled image of the object.

In other words, for example, as shown in FIGS. 6 and 7, in a case where the image-capturing optical unit 21 is provided with the prismatic-mirror assembly 40 and the display optical unit 32 is provided with the prismatic-mirror assembly 50, when the side surfaces of the prismatic mirrors 41 of the prismatic-mirror assembly 40 become perpendicular to the optical axis of the previously-described imaginary camera, which is optically equivalent to the camera 43, each prismatic mirror 41 reflects a light beam from an object by 180°. In this case, an image that is equivalent to the image of the object captured directly by the camera 43 is obtained. If such an image of the object is defined as the front image of the object, the front image of the object, as shown in FIG. 23A, is equivalent to what can be seen when a user views the object directly.

Figure 23B:
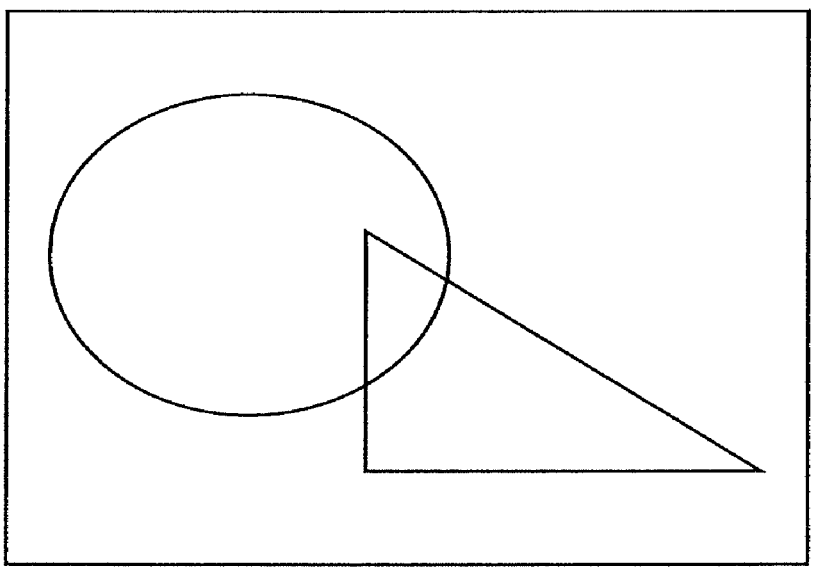
FIG. 23B also illustrates the front image of the object and the angled image of the object.

On the other hand, if each prismatic mirror 41 reflects the light beam from the object by an angle other than 180°, the image captured by the camera 43 (which will be referred to as an angled image hereinafter), as shown in FIG. 23B, is extended sideways in comparison to the front image of the object shown in FIG. 23A.

Accordingly, by detecting the frame that displays the front image of the object from the frames of the images of the object captured by the camera 43, the timing of that particular frame can be found. Such timing indicates when the side surfaces of the prismatic mirrors 41 of the prismatic-mirror assembly 40 become perpendicular to the optical axis of the imaginary camera.

Furthermore, in the first embodiment in FIGS. 6 and 7, in a state where the side surfaces of the prismatic mirrors 41 of the prismatic-mirror assembly 40 are perpendicular to the optical axis of the imaginary camera and each prismatic mirror 41 reflects the light beam of an object by 180°, the display optical unit 32 will become in phase with the image-capturing optical unit 21 if the side surfaces of the prismatic mirrors 51 of the prismatic-mirror assembly 50 are perpendicular to the optical axis of the previously-described imaginary projector, which is optically equivalent to the projector 53, and each prismatic mirror 51 reflects a light beam from the projector 53 by 180°.

With respect to the emission timing of the light beam corresponding to the front image of the object from the projector 53, the display optical unit 32 can operate in phase with the image-capturing optical unit 21 at the same period by rotating each of the prismatic mirrors 51 such that the side surfaces of the prismatic mirrors 51 of the prismatic-mirror assembly 50 become perpendicular to the optical axis of the imaginary projector.

In the display apparatus 12, the controller 34 detects the frame of the front image of the object from the frames of the images of the object captured by the image-capturing apparatus 11. Based on the timing of that particular frame, the controller 34 controls the driver 33 in order to rotate each prismatic mirror 51 such that the side surfaces of the prismatic mirrors 51 become perpendicular to the optical axis of the imaginary projector.

The prismatic mirrors 41 and 51 are preliminarily set at the same rotational rate.

The controller 34 detects the frame of the front image of the object from the frames of the images of the object captured by the image-capturing apparatus 11 in, for example, the following manner.

Figure 24A:
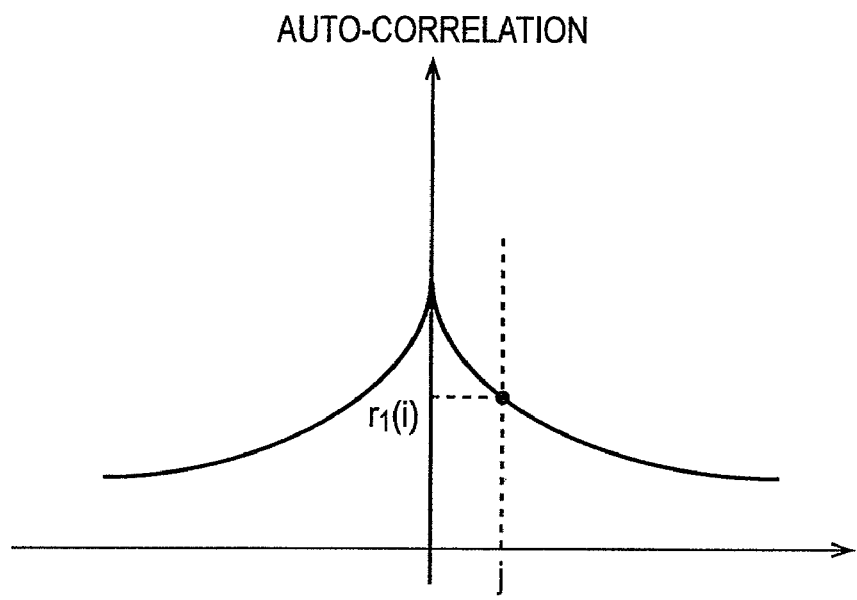
FIG. 24A illustrates the auto-correlation patterns of the front image of the object and the angled image of the object.
Figure 24B:
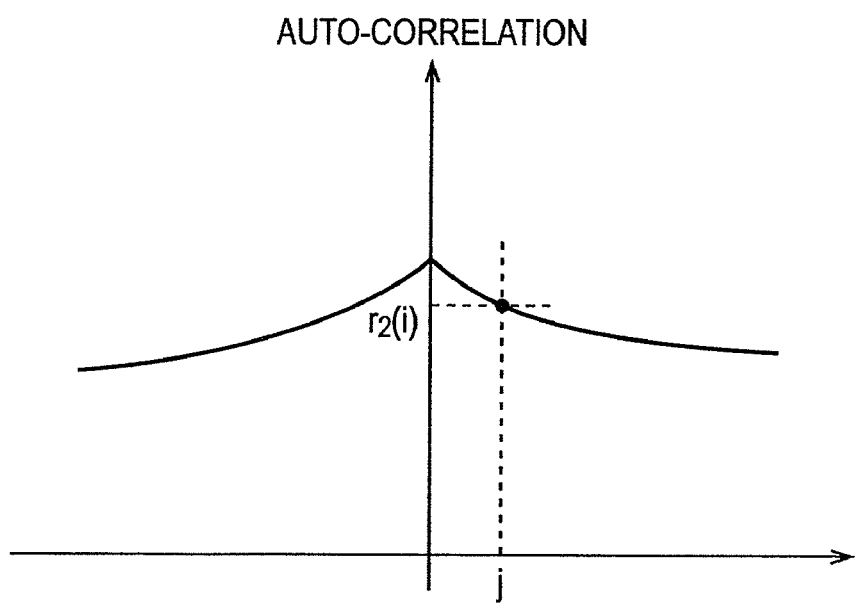
FIG. 24B also illustrates the auto-correlation patterns of the front image of the object and the angled image of the object.

If the auto-correlation in the horizontal direction for each of the frames of the images of the object captured by the image-capturing apparatus 11 (for example, the auto-correlation of pixels along a certain horizontal line) is determined, the determined values form an auto-correlation pattern having a cuspidate shape as shown in FIGS. 24A and 24B.

As shown in FIG. 24A, the auto-correlation pattern of the frame of the front image of the object in the horizontal direction forms a sharp curve. In contrast, as shown in FIG. 24B, according to the auto-correlation pattern of the frame of one of the angled images of the object in the horizontal direction, the determined values change in a gradual manner since the image is extended sideways.

Consequently, the auto-correlation function value $r_1(j)$ of the front image of the object with respect to a certain shifting value j is smaller than the auto-correlation function value $r_2(j)$ of one of the angled images of the object with respect to the same shifting value j. Therefore, by detecting the frame having the minimum auto-correlation function value with respect to a certain shifting value, for example, that detected frame is determined as the frame of the front image of the object.

The controller 34 determines the auto-correlation in the horizontal direction for each of the frames of the images of the object captured by the image-capturing apparatus 11, and detects the frame having the minimum auto-correlation function value with respect to a certain shifting value j in order to determine the frame of the front image of the object. Moreover, by detecting the synchronism of frames having the minimum auto-correlation function value, the rotational cycle of the prismatic mirrors 41 can be determined.

Accordingly, the controller 34 detects the frame of the front image of the object, and with respect to the emission timing of a light beam corresponding to the detected front image of the object from the projector 53, the controller 34 controls the driver 33 in order to rotate each prismatic mirror 51 such that the side surfaces of the prismatic mirrors 51 of the prismatic-mirror assembly 50 become perpendicular to the optical axis of the imaginary projector. This allows the prismatic mirrors 51 in the display optical unit 32 to rotate in phase with the prismatic mirrors 41 in the image-capturing optical unit 21 without using the drive data.

For example, as shown in FIG. 14, if the image-capturing optical unit 21 is provided with the lens plate 60 having the semi-cylindrical lenses 61 and the display optical unit 32 is provided with the lens plate 70 having the semi-cylindrical lenses 71, the light beam from the object is transmitted through the semi-cylindrical lenses 61 of the lens plate 60 without changing its direction. The camera 43 then receives the light beam so as to capture the image of the object, namely, the front image of the object.

According to the second embodiment in FIG. 14, the controller 34 (FIG. 3) in the display apparatus 12 detects the frame of the front image of the object from the frames of images captured by the image-capturing apparatus 11. Based on the emission timing of a light beam corresponding to the front image of the object from the projector 53, the lens plate 70 is driven so that the semi-cylindrical lenses 71 are shifted to a position where the semi-cylindrical lenses 71 can transmit the light beam from the projector 53 without changing the direction. Consequently, in the display apparatus 12, the lens plate 70 operates in phase with the lens plate 60 in the image-capturing apparatus 11 without the use of the drive data.

The series of operations by the controllers 24 and 34 may be performed using hardware or software. If software is used for this series of operations, a software program may be installed in, for example, a general-purpose computer.

Figure 25:
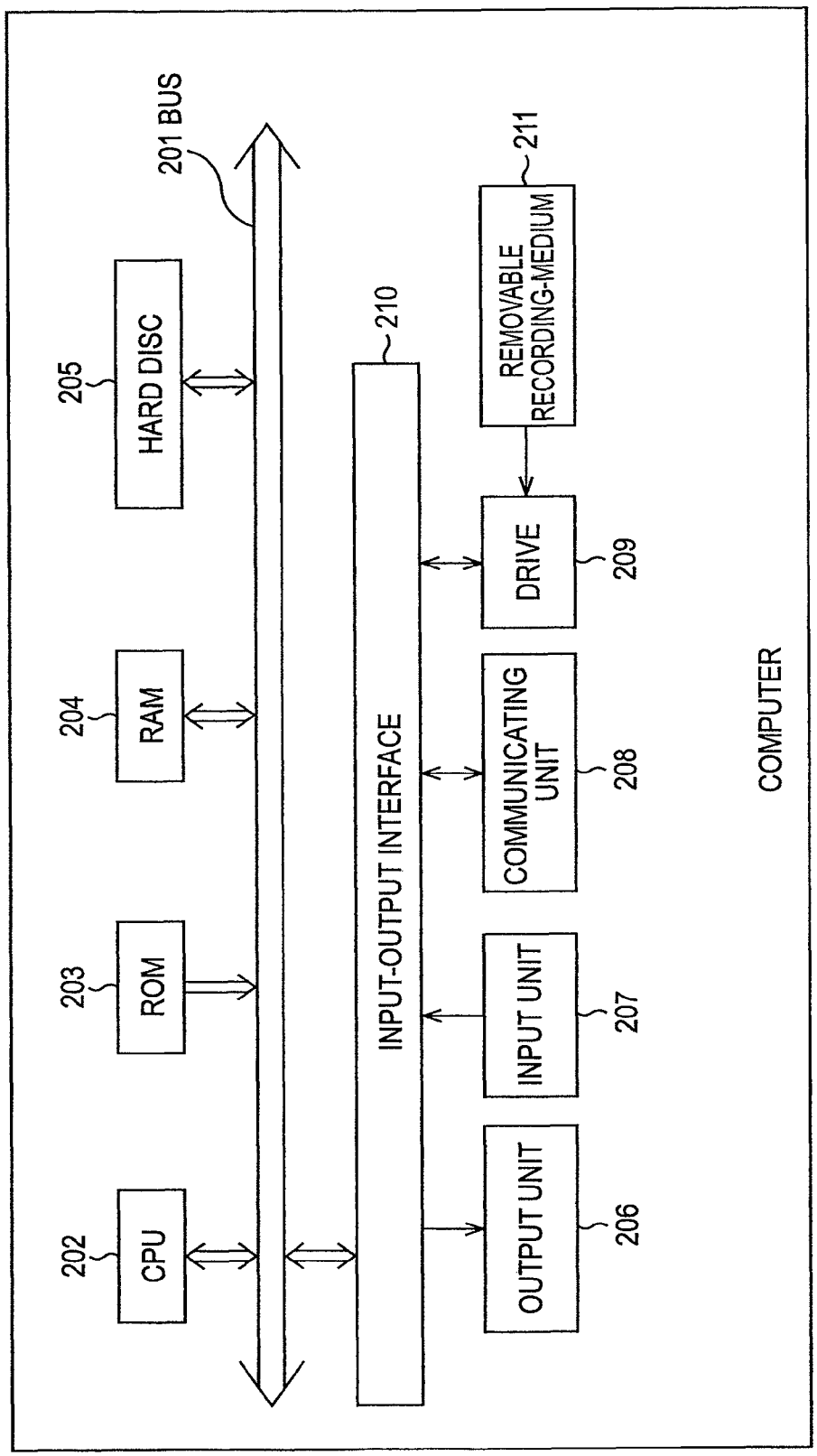
FIG. 25 is a block diagram illustrating a computer which performs the operations of the controllers 24 and 34.

FIG. 25 illustrates an embodiment of a computer in which the program for running the series of operations is installed.

The program may be preliminarily written onto a recording medium, such as a hard disc 205 and a ROM 203, built inside the computer.

Alternatively, the program may be temporarily or permanently stored in (written onto) a removable recording-medium 211 such as a flexible disc, a CD-ROM (Compact Disc Read Only Memory), an MO (Magneto Optical) disc, a DVD (Digital Versatile Disc), a magnetic disc, and a semiconductor memory. The removable recording-medium 211 of this type may be distributed as packaged software.

Other than installing the program in the computer from the removable recording-medium 211, the program may be transferred to the computer from a download site by radio via satellite for Digital Satellite Broadcasting, or may be transferred to the computer by wire via a network such as a LAN (Local Area Network) and the Internet. The transferred program is thus received by a communicating unit 208 in the computer and is installed in an internal hard disc 205.

The computer includes a built-in CPU (Central Processing Unit) 202. The CPU 202 is connected to an input-output interface 210 via a bus 201. When a user, for example, operates an input unit 207, such as a keyboard, a mouse, and a microphone, so as to input a command to the CPU 202 via the input-output interface 210, a program stored in the ROM (Read Only Memory) 203 is executed. Alternatively, a program stored in the hard disc 205; a program that is transferred via satellite or network, received by the communicating unit 208, and then installed in the hard disc 205; or a program that is read out from the removable recording-medium 211 mounted on a drive 209 and installed in the hard disc 205 may be loaded onto a RAM (Random Access Memory) 204 so that the program is executed by the CPU 202. Consequently, the CPU 202 performs the operation according to the flow charts described previously, or the operation according to the block diagrams described previously. According to need, for example, the CPU 202 outputs the result of the operation from an output unit 206, such as an LCD (Liquid Crystal Display) and a speaker, via the input-output interface 210. Alternatively, the result of the operation may be transmitted via the communicating unit 208, or may be, for example, written onto the hard disc 205.

In this description, the steps describing the program for the computer to perform each operation do not necessarily need to be performed in the time order of the flow charts described above. The steps may be performed in parallel or individually (for example, by parallel processing or by object-oriented processing).

The program may be either operated with one computer or operated with multiple computers in a distributed manner. Furthermore, the program may be transferred to a remote computer so as to be executed in that computer.

For the projector 53 (and each of the projectors $53_1$ to $53_4$), for example, a liquid-crystal projector, a DLP projector, or a projector provided with an ILA™ (Image Light Amplifier) may be used. A DLP projector is provided with a DMD™ (Digital Micromirror Device) and is based on DLP™ (Digital Light Processing).

Furthermore, although the lens plate 60 in the second embodiment in FIG. 14 is a lenticular-lens assembly provided with a plurality of semi-cylindrical lenses 61, instead of the lenticular-lens assembly, the lens plate 60 may be an alternative optical element that periodically changes the angle of refraction of the transmitted light beam.

Each of the semi-cylindrical lenses 61 is capable of refracting a light beam in various directions depending on the incident point of the light beam on the semi-cylindrical lens 61, and then transmitting the light beam. This means that the lens plate 60 having the plurality of such semi-cylindrical lenses 61 is capable of refracting and transmitting beam components of a light beam in the same direction if the beam components enter the corresponding incident points on the semi-cylindrical lenses 61 in the horizontal direction, the space between adjacent incident points being equivalent to the width of each semi-cylindrical lens 61.

As described above, the lens plate 60 may be any type of an optical element that can periodically change the angle of refraction of the transmitted light beam. For example, other than the lenticular-lens assembly having the plurality of semi-cylindrical lenses 61, gradient index lenses may be used as an alternative. Furthermore, for the lens plate 60, it is also possible to use a transparent plate material, such as a Fresnel lens, which is partially removed at a certain interval such that small protrusions are provided thereon. The same applies for the lens plate 70, the disc lens plates 80 and 90, and the lens drums 100 and 110.

Although the exposure time (or the shutter speed) of the camera 43 (and each of the cameras $43_1$ to $43_4$) is not specified in the above embodiments, the exposure time of the camera 43 is preferably shorter than the rotation period of the prismatic mirrors 41 and 51, or the rotation (shifting) period of the semi-cylindrical lenses 61 and 71.

INDUSTRIAL APPLICABILITY

According to the present invention, images having high spatial resolution are provided while allowing selectable viewpoints of the images.

The invention claimed is:
1. An image-capturing apparatus comprising:
an image-capturing optical unit which reflects or transmits a light beam from an object;
an image-capturing controller for controlling the image-capturing optical unit to allow the image-capturing optical unit to operate in a periodical manner;
an image-capturing driver for driving the image-capturing optical unit based on the control operation by the image-capturing controller; and
at least one image-capturing unit which receives the light beam from the object entering via the image-capturing optical unit operating periodically so as to capture an image of the object,
wherein the at least one image-capturing unit captures the image of the object with a field of view substantially equal to 360° during a period when the image-capturing optical unit is operated in the periodical manner, and
wherein the image-capturing controller multiplexes and outputs drive data for controlling the image-capturing optical unit and image data captured by the at least one image-capturing unit,
wherein the image-capturing optical unit comprises a semi-conical mirror disposed around the outer side of a slit plate and surrounds the slit plate,
wherein an inner surface of the semi-conical mirror is reflective and is disposed at a 45 degree angle with respect to side surfaces of the slit plate and a lens drum, and
wherein all light beam components transmitted through the lens drum and slit plate enter the semi-conical mirror and are reflected upward.

2. The image-capturing apparatus according to claim 1, wherein the image-capturing optical unit changes an optical path of the light beam from the object.

3. The image-capturing apparatus according to claim 1, wherein the image-capturing optical unit comprises a prismatic-mirror assembly in which a plurality of prismatic mirrors are arrayed, and
wherein the image-capturing controller rotates the prismatic mirrors in the prismatic-mirror assembly in phase with one another at a constant angular rate such that each prismatic mirror rotates about a rotary axis extending between central points two end surfaces of the prismatic mirror.

4. The image-capturing apparatus according to claim 3, wherein the prismatic mirrors in the prismatic-mirror assembly are arrayed parallel to one another in the same plane while the rotary axis of each prismatic mirror extends in the vertical direction, and
wherein the prismatic mirrors reflect beam components of the light beam from the object entering from various directions towards said at least one image-capturing unit.

5. The image-capturing apparatus according to claim 1, wherein the image-capturing optical unit comprises a lenticular-lens assembly in which a plurality of semi-cylindrical lenses are arrayed, and
wherein the image-capturing controller controls the lenticular-lens assembly in a periodical manner such that the semi-cylindrical lenses in the lenticular-lens assembly are shifted periodically.

6. The image-capturing apparatus according to claim 5, wherein the image-capturing optical unit further comprises slits through which the light beam emitted from the object and transmitted through the semi-cylindrical lenses passes.

7. The image-capturing apparatus according to claim 5, wherein the semi-cylindrical lenses in the lenticular-lens assembly are arrayed parallel to one another in the same plane while each semi-cylindrical lens extends longitudinally in the vertical direction, and
wherein the image-capturing controller oscillates the lenticular-lens assembly horizontally in a periodical manner.

8. The image-capturing apparatus according to claim 5, wherein the lenticular-lens assembly is circular such that the semi-cylindrical lenses are arrayed to form a circle, each semi-cylindrical lens extending longitudinally along the radius of the circle, and
wherein the image-capturing controller rotates the circular lenticular-lens assembly at a predetermined period.

9. The image-capturing apparatus according to claim 5, wherein the lenticular-lens assembly is cylindrical such that the semi-cylindrical lenses are arrayed to form a cylinder, each semi-cylindrical lens extending longitudinally in the vertical direction, and
wherein the image-capturing controller rotates the cylindrical lenticular-lens assembly at a predetermined period.

10. The image-capturing apparatus according to claim 9,
wherein the object is disposed outside the cylindrical lenticular-lens assembly, and
wherein said at least one image-capturing unit is disposed inside the cylindrical lenticular-lens assembly so as to receive the light beam from the object via the lenticular-lens assembly.

11. The image-capturing apparatus according to claim 9,
wherein the object is disposed inside the cylindrical lenticular-lens assembly, and
wherein said at least one image-capturing unit is disposed outside the cylindrical lenticular-lens assembly so as to receive the light beam from the object via the lenticular-lens assembly.

12. The image-capturing apparatus according to claim 11,
wherein said at least one image-capturing unit comprises a plurality of image-capturing units,
wherein each of the image-capturing units is disposed outside the cylindrical lenticular-lens assembly so as to receive the light beam from the object via the lenticular-lens assembly.

13. The image-capturing apparatus according to claim 1, further comprising a reflective unit for reflecting the light beam from the object traveling through the lenticular-lens assembly towards said at least one image-capturing unit.

14. The image-capturing apparatus according to claim 1, further comprising a display device for displaying the image of the object captured by said at least one image-capturing unit.

15. The image-capturing apparatus according to claim 14, wherein the display device comprises:
at least one light-emitting unit for emitting the light beam corresponding to the image of the object captured by said at least one image-capturing unit;
a display optical unit for reflecting or transmitting the light beam emitted from said at least one light-emitting unit;
a display controller for controlling the display optical unit to allow the display optical unit to operate in a periodical manner; and
a display driver for driving the display optical unit based on the control operation by the display controller.

16. The image-capturing apparatus according to claim 15, wherein the display device further comprises a diffuser which diffuses the light beam corresponding to the image of the object received via the display optical unit, which operates in a periodical manner, so as to display the image of the object.

17. The image-capturing apparatus according to claim 15, wherein the image-capturing optical unit comprises a first prismatic-mirror assembly in which a plurality of prismatic mirrors are arrayed,
wherein the image-capturing controller rotates the prismatic mirrors in the first prismatic-mirror assembly in phase with one another at a constant angular rate such that each prismatic mirror rotates about a rotary axis extending between central points of two end surfaces of the prismatic mirror,
wherein the display optical unit comprises a second prismatic-mirror assembly having the same structure as the first prismatic-mirror assembly, and
wherein the display controller rotates the prismatic mirrors in the second prismatic-mirror assembly in phase with the prismatic mirrors in the first prismatic-mirror assembly at a constant angular rate such that each prismatic mirror in the second prismatic-mirror assembly rotates about a rotary axis extending between central points of two end surfaces of the prismatic mirror in the second prismatic-mirror assembly.

18. The image-capturing apparatus according to claim 17,
wherein the prismatic mirrors in each of the first and second prismatic-mirror assemblies are arrayed parallel to one another in the same plane while the rotary axis of each prismatic mirror extends in the vertical direction,
wherein the prismatic mirrors in the first prismatic-mirror assembly reflect beam components of the light beam from the object entering from various directions towards said at least one image-capturing unit, and
wherein the prismatic mirrors in the second prismatic-mirror assembly reflect the light beam emitted from said at least one light-emitting unit.

19. The image-capturing apparatus according to claim 15, further comprising an output unit for outputting the drive data and the image data of the object, the drive data indicating the timing for driving the image-capturing optical unit by the image-capturing driver, the image data being obtained when said at least one image-capturing unit captures the image of the object,
wherein the display controller allows the display driver to drive the display optical unit based on the drive data.

20. The image-capturing apparatus according to claim 15, further comprising an image detector for detecting the image of the object captured by said at least one image-capturing unit when the image-capturing optical unit reflects the light beam from the object by 180.degree, or directly transmits the light beam from the object,
wherein the display controller controls the display driver based on the detection result of the image of the object by the image detector.

21. A method for capturing an image of an object comprising the steps of:
controlling an image-capturing optical unit, which reflects or transmits a light beam from the object, so as to allow the image-capturing optical unit to operate in a periodical manner;
driving the image-capturing optical unit based on the controlling step; and
receiving the light beam from the object via the image-capturing optical unit operating periodically so as to capture the image of the object,
wherein the method further comprises a capturing step for capturing the image of the object with a field of view substantially equal to 360° during a period when the image-capturing optical unit is operated in the periodical manner, and
wherein the controlling step further multiplexes and outputs drive data for controlling the image-capturing optical unit and image data
wherein the image-capturing optical it comprises a semi-conical mirror disposed around the outer side of a slit plate and surrounds the slit plate,
wherein an inner surface of the semi-conical mirror is reflective and is disposed at a 45 degree angle with respect to side surfaces of the slit plate and a lens drum, and
wherein all light beam components transmitted through the lens drum and slit plate enter the semi-conical mirror and are reflected upward.

* * * * *